US008656445B2

(12) United States Patent
Ress et al.

(10) Patent No.: US 8,656,445 B2
(45) Date of Patent: Feb. 18, 2014

(54) MULTIMEDIA SUBSYSTEM CONTROL FOR INTERNET PROTOCOL BASED TELEVISION SERVICES

(75) Inventors: David P. Ress, Cary, NC (US); Dominic Goodwill, Kanata (CA); Anthony Jones, Kanata (CA); Steve J. McKinnon, Cary, NC (US)

(73) Assignee: Genband US LLC, Plano, TX (US)

( * ) Notice: Subject to any disclaimer, the term of this patent is extended or adjusted under 35 U.S.C. 154(b) by 1847 days.

(21) Appl. No.: 11/563,306

(22) Filed: Nov. 27, 2006

(65) Prior Publication Data
US 2008/0127255 A1 May 29, 2008

(51) Int. Cl.
H04N 7/173 (2011.01)
H04N 5/445 (2011.01)
H04N 7/16 (2011.01)
G06F 13/00 (2006.01)

(52) U.S. Cl.
USPC .......... 725/120; 725/80; 348/14.12; 370/261

(58) Field of Classification Search
USPC ............. 725/112, 113, 80, 81, 141, 151, 89, 725/120, 91, 109, 138; 709/228; 370/261; 348/14.12
See application file for complete search history.

(56) References Cited

U.S. PATENT DOCUMENTS

| 6,170,060 | B1 | 1/2001 | Mott et al. | |
|---|---|---|---|---|
| 6,618,858 | B1 * | 9/2003 | Gautier | 725/132 |
| 7,103,906 | B1 | 9/2006 | Katz et al. | |
| 7,472,197 | B2 * | 12/2008 | Li et al. | 709/231 |
| 2002/0106081 | A1 | 8/2002 | Yang | |
| 2005/0252959 | A1 | 11/2005 | Gaumond et al. | |
| 2006/0018272 | A1 * | 1/2006 | Mutikainen et al. | 370/328 |
| 2006/0041923 | A1 * | 2/2006 | McQuaide, Jr. | 725/131 |
| 2006/0215650 | A1 * | 9/2006 | Wollmershauser et al. | 370/389 |
| 2006/0259927 | A1 | 11/2006 | Acharya et al. | |
| 2007/0079207 | A1 * | 4/2007 | Seidel et al. | 714/748 |

(Continued)

FOREIGN PATENT DOCUMENTS

EP 1 926 319 A2 5/2008
WO 2006/057606 A1 6/2006

OTHER PUBLICATIONS (Ayedele Damola; IMS Service proxy in HIGA; Ericsson; filed, Jun. 2, 2006).*
European Search Report for EP 07021799, mailed Mar. 27, 2009.

(Continued)

*Primary Examiner* — Pankaj Kumar
*Assistant Examiner* — Reuben M Brown
(74) *Attorney, Agent, or Firm* — Jenkins, Wilson, Taylor & Hunt, P.A.

(57) ABSTRACT

The present invention allows Internet Protocol television (IPTV) services to be provided to different types of subscriber devices over different types of networks via a multimedia subsystem, such as an IP multimedia subsystem. A given subscriber may have one subscription supporting IPTV services to different types of subscriber devices. Each of the subscriber devices may register with a given IPTV application server, which will interact with the various subscriber devices using a common session control protocol, such as the Session Initiation Protocol (SIP). The IPTV sessions may support delivery of various types of streaming content, such as audio or video content, for broadcast or on-demand services. Different IPTV sessions are used to support broadcast and on-demand services. However, within a given broadcast or on-demand IPTV session, channels may be changed or the streaming media may be controlled within the respective IPTV sessions.

18 Claims, 20 Drawing Sheets

(56) References Cited

U.S. PATENT DOCUMENTS

| | | |
|---|---|---|
| 2007/0097914 A1* | 5/2007 | Grilli et al. .................... 370/329 |
| 2007/0157222 A1* | 7/2007 | Cordray et al. ................. 725/13 |
| 2007/0220553 A1* | 9/2007 | Branam et al. .................. 725/46 |
| 2008/0127255 A1* | 5/2008 | Ress et al. ....................... 725/38 |
| 2008/0151888 A1* | 6/2008 | Ahmed .......................... 370/390 |
| 2008/0288458 A1* | 11/2008 | Sun et al. .......................... 707/3 |
| 2009/0077602 A1* | 3/2009 | O'Neil .......................... 725/109 |
| 2009/0106793 A1* | 4/2009 | Tecot et al. .................... 725/38 |
| 2009/0138476 A1* | 5/2009 | Zimler et al. ..................... 707/9 |
| 2009/0190603 A1* | 7/2009 | Damola et al. ................ 370/401 |
| 2010/0049856 A1* | 2/2010 | Wright et al. ................. 709/227 |
| 2010/0074267 A1* | 3/2010 | Ladd ............................ 370/401 |

OTHER PUBLICATIONS

Communication pursuant to Article 94(3) EPC for European application No. 07021799.7 (Dec. 1, 2009).

* cited by examiner

| PUBLIC SUBSCRIPTION ID | PRIVATE IDs | | |
|---|---|---|---|
| | STB | PC | PDA |
| JANEDOE | JANESTB1 | JANEPC1 | JANEPDA1 |

*FIG. 2*

MULTIMEDIA SUBSYSTEM CONTROL FOR INTERNET PROTOCOL BASED TELEVISION SERVICES

FIELD OF THE INVENTION

The present invention relates to television services provided over packet networks, and in particular to controlling television services provided using the Internet Protocol.

BACKGROUND OF THE INVENTION

Television services are now being provided over packet-based networks in addition to the traditional terrestrial, cable, and satellite networks. Television (TV) services provided over packet-based networks using the Internet Protocol (IP) are generally referred to as IPTV services. Given the flexibility afforded by packet-based delivery, IPTV services can be provided to various types of subscriber devices over various types of networks. Further, this flexibility not only supports linear television services, but also a broader set of services, which may still be referred to as IPTV services. No standard definition of IPTV services exists at this time. Broadly, IPTV services should be understood to include entertainment media services, information media services, advertising media services, personal media content services, person-to-person communications services, and person-to-machine communications services, including the functions of aggregating, storing, offering, selecting, streaming and controlling such services.

Subscriber devices are used by subscribers to interact with IPTV services. Subscriber devices include televisions, set-top boxes, game consoles, media center devices, computers, mobile phones, personal digital assistants, and other devices. A subscriber is said to have a plurality of subscriptions, wherein a subscription is an agreement between the subscriber and the IPTV service provider as to the rules and limitations under which the subscriber may use the IPTV service. The subscription may have a long duration that allows the subscriber to access the service many times, or the subscription may be transitory and allow only a single access to the service. The subscription may include a definition of commercial and contractual relationships between the subscriber and service provider, or the subscription may be defined within the context of other commercial or contractual relationships, or may be purely a functional arrangement to facilitate service delivery with no commercial or contractual relationship. Notwithstanding that a subscription may in general include commercial or contractual information, the term "subscription" is generally understood to include the machine-to-machine relationships that allow a service to function, unless explicitly indicated otherwise.

Unfortunately, a common subscription is not available to allow IPTV services to be delivered to different types of subscriber devices or over different networks. Currently, different subscriptions are required for different types of subscriber devices or different networks. This makes the set of IPTV services complex for the service provider to provide, and complex for the subscriber to use. As such, there is a need for an architecture allowing IPTV services to be provided to different types of subscriber devices or over different networks under a single subscription.

When IPTV services are provided to different types of subscriber devices or over different networks, different IPTV services are presently required for each type of subscriber device or network. Each IPTV service may use different communication protocols to control the service and provide a different user interface and viewing interface to the subscriber. Accordingly, there is a further need to provide a more consistent communication infrastructure and subscriber experience among IPTV services provided to different types of subscriber devices over different networks.

SUMMARY OF THE INVENTION

The present invention allows Internet Protocol television (IPTV) services to be provided to different types of subscriber devices over different types of networks via a multimedia subsystem. Those skilled in the art will recognize the IP (Internet Protocol) multimedia subsystem (IMS) as an architecture containing an instance of such a multimedia subsystem, which provides certain services to applications and devices as described herein. A given subscriber may have one subscription supporting IPTV services on different types of subscriber devices. Each of the subscriber devices may register with the multimedia subsystem to receive service from a given IPTV application server. The interaction between the various subscriber devices and the IPTV applications may use a common session control protocol, such as the Session Initiation Protocol (SIP).

The IPTV sessions may support delivery of various types of streaming content, such as audio or video content, for broadcast or on-demand services. In one embodiment of the present invention, different IPTV sessions are generally used to support broadcast and on-demand services, although this invention does not preclude a session containing both broadcast and on-demand content. Within a given broadcast session, channels may be changed without necessarily destroying or modifying the attributes of the session. Likewise, within a unicast or on-demand based session, media streams may be manipulated (pause, rewind, fast-forward, etc.) without necessarily impacting the session definition.

Further, service data including configuration data, subscription data, and programming guide information commonly referred to as metadata, may be requested by the various subscriber devices via the same session control protocol used for registration and session creation. In response to service data requests, the IPTV application may in turn use the session control protocol to provide the requested data to the requesting device via direct or indirect mechanisms. Using the direct mechanism, the service data is provided directly within the session control protocol message body. With the indirect mechanism, the session control protocol message body returns a reference to the service data, such as a Universal Resource Locator (URL) or address of an IP multi-cast stream within which the data is found.

By using the common session control protocol, services may be presented to the different types of subscriber devices in a uniform manner. When a subscriber has multiple subscriber devices, the subscriber may be associated with a common subscriber identity used to uniquely identify the subscriber across all of those devices. Associated with this common subscriber identity may be a set of one or more private identities, each with its own unique authentication credentials, that may be used at registration time to authenticate and form the binding between the subscriber and the particular device within the multimedia subsystem. This enables the IPTV application to identify the subscriber regardless of the specific device in use and to be assured that the subscriber is authenticated. In a preferred embodiment, a common subscriber identity may be simultaneously registered with multiple devices.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 illustrates the association of public subscriber identities and private identities according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows network providers to provide Internet Protocol television (IPTV) services over a multimedia subsystem, such as an Internet Protocol Multimedia Subsystem (IMS), which functions as an application control framework. IPTV sessions are established and controlled at a high level by the multimedia subsystem, and may be separated from service presentation and user interaction, which may be facilitated through other mechanisms within the IPTV sessions. Accordingly, one embodiment of the present invention provides an architecture for separating service presentation and user interaction from IPTV session establishment and control.

The present invention also allows a given subscriber to receive IPTV services through various devices via different networks. For example, IPTV services for the subscriber may be provided over traditional cable networks to a television through a set-top box, as well as to other devices, such as personal computers and mobile terminals, which may or may not be supported via the cable network. A subscriber may be associated with a single subscriber identity that is recognized by the IPTV application in rendering IPTV services to any and all of the subscriber's devices. In essence, the present invention allows the delivery of broadcast, video-on-demand and other IPTV services to any compatible devices available to the subscriber. For the purpose of brevity, this invention will be described in the context of broadcast television and video-on-demand services, but the invention should be understood to include all forms of IPTV service. Prior to delving into the details of the present invention, an overview of a communication environment in which the present invention may be employed is described.

Figure 1:
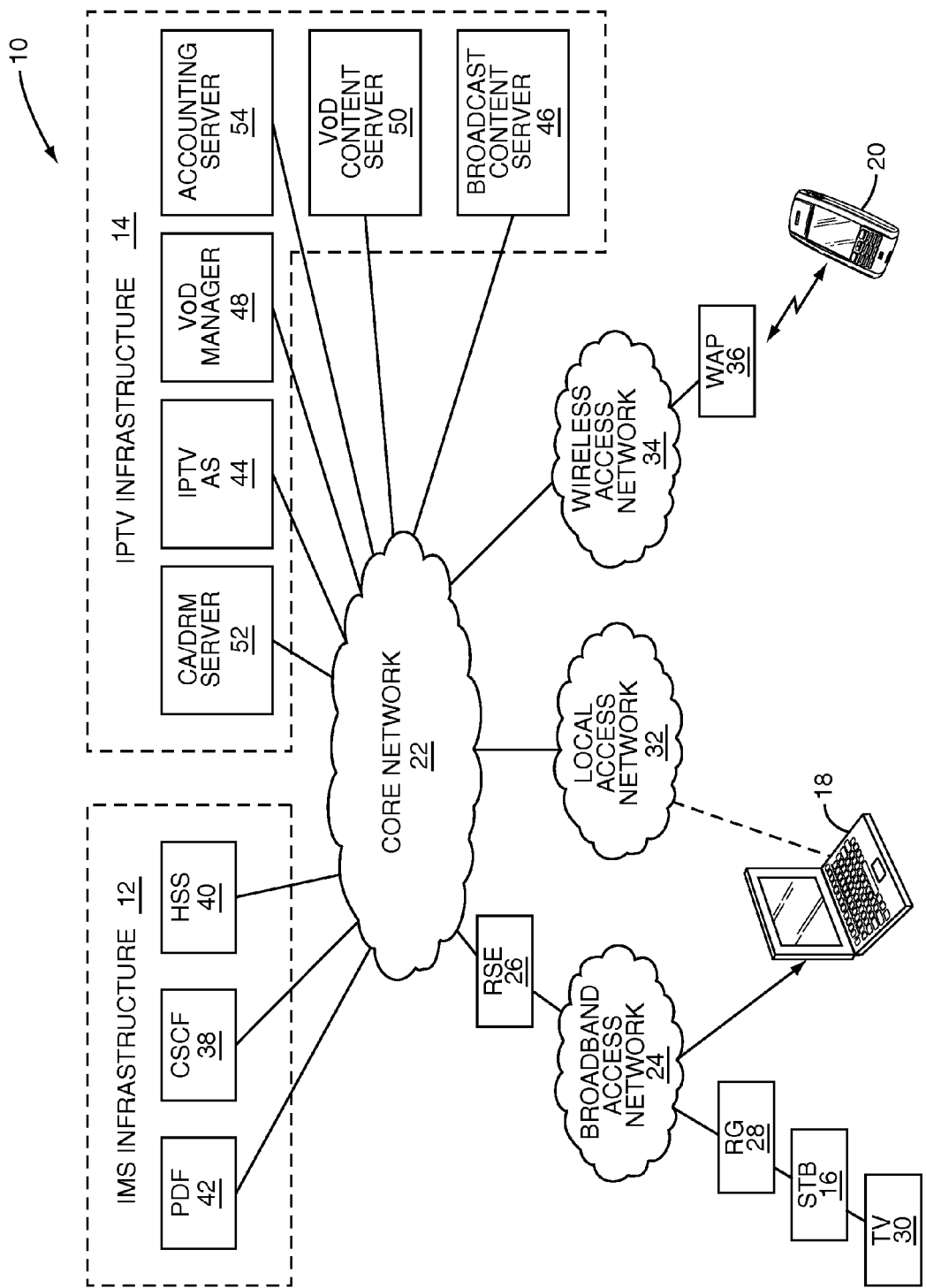
FIG. 1 is a block representation of a communication environment configured according to one embodiment of the present invention.

With reference to FIG. 1, a communication environment 10 is provided wherein a multimedia subsystem infrastructure, such as an IMS infrastructure 12, cooperates with an IPTV infrastructure 14 to control the delivery of IPTV services to a set-top box (STB) 16 and personal computer (PC) 18, as well as a personal digital assistant (PDA) 20 over a core network 22. IPTV services intended for the set-top box 16 may be provided via a broadband access network 24, such as a cable or digital subscriber line (DSL) network, which is coupled to the core network 22 via a residential services edge (RSE) 26, and to the set-top box 16 via a routing gateway (RG) 28 at the customer premises edge. The residential services edge 26 may be a Layer 3 edge device. Further, the routing gateway 28 may include any necessary network address translation and firewall functions. In operation, IPTV sessions are established through the core network 22 from the IPTV infrastructure 14 under the control of the IMS infrastructure 12, and enable delivery of video content, which represents either broadcast or video-on-demand content, to the set-top box 16. The set-top box 16 can process the incoming video content and provide an appropriate signal to a television (TV) 30 to enable the subscriber to view the desired video content.

The PC 18 may be coupled to the core network 22 via the broadband access network 24, or via a local access network 32, depending on access and connectivity. Similarly, the PDA 20 may be coupled to the core network 22 through an appropriate wireless access network 34 and appropriate wireless access point (WAP) 36. In this illustration, the wireless access network 34 may include traditional wireless local area network (WLAN) or cellular infrastructures, which are capable of supporting packet-based communications. With either of the PC 18 or the PDA 20, the subscriber may receive video content through the access network currently supporting these devices. In operation, an overall IPTV session is established between the IPTV infrastructure 14 and a particular subscriber device, such as the set-top box 16, PC 18, or PDA 20, under the control of the IMS infrastructure 12. The established IPTV session provides the mechanism through which the video content is delivered to the appropriate subscriber device.

At the center of the IMS infrastructure 12 is a call/session control function (CSCF) 38, which may represent any one or a combination of the proxy, interrogating, and serving CSCFs defined by the IMS standards. As such, the CSCF 38 represents a signaling control node for IPTV sessions, and is able to invoke various application services (AS) to incorporate in the signaling for the IPTV session. The IMS infrastructure 12 also provides a subscriber database, which is referred to as a home subscriber service (HSS) 40 in IMS parlance. A policy decision function (PDF) 42 is also provided for resource management and admission control services.

The IPTV infrastructure 14 includes an IPTV application server (AS) 44, which is an application server that is called by the CSCF 38 to control IPTV services. For broadcast IPTV services, the IPTV AS 44 may allow the various subscriber devices to receive video content from any number of broadcast channels that are provided by a broadcast content server 46. Broadcast channels in an IPTV service may be delivered through the core network 22 by means of an IP multi-cast function. The broadcast content server 46 should be understood to include functions for storing and re-generating broadcast channel content or functions for capturing broadcast content from an external source (not shown) and converting it to a format adapted to the communication environment 10. For video-on-demand (VoD), the IPTV AS 44 may cooperate with a VoD manager 48, which will control a VoD content server 50 to deliver video content to the subscriber device within a defined IPTV session. Notably, within a given IPTV broadcast session the subscriber may change broadcast channels, and within a given IPTV VoD Session may control VoD content. All of these and additional functions will be described in association with the communication flows described later in this specification. The IPTV infrastructure 14 may also include a conditional access (CA) and digital rights management (DRM) server 52, as well as an accounting server 54. The CA/DRM server 52 provides content protection such as digital rights management and encryption, and may provide key management and distribution through rights objects which may be distributed via messages typically known in the art as Entitlement Management messages (EMMs) to the subscriber's devices to allow the video content to be decrypted or decoded. The accounting server 54 may be employed to provide accounting and billing functions for both broadcast and VoD IPTV services.

In the following communication flows, an exemplary embodiment of the present invention is provided. As presented, the present invention includes multiple features that are optional and need not be employed to carry out the concepts of the overall invention. Certain of these features are as follows. Multiple IPTV services for a given subscriber, regardless of the subscriber device, are associated with a single public subscription ID. In order to enable this public ID to be associated with a plurality of devices, the subscriber may also be associated with one or more private ID-authentication credential pairs. Through the subscriber registration procedures, the multimedia subsystem provides a binding between the public ID and device and performs authentication of the subscriber identity via any one of the private identity-authentication credential pairs. As illustrated in FIG. 2, a public subscription ID of JANEDOE may be mapped to three different private-ID-authentication credential pairs. In an exemplary embodiment of the invention the private IDs correspond to specific user devices set-top box 16 (JAN-ESTB1); PC 18 (JANEPC1); and the PDA 20 (JANEPDA1). In an alternative embodiment, a single private ID-authentication pair could be utilized across multiple devices. Accordingly, one embodiment of the present invention may employ the public and private ID architecture, which is supported by IMS. The interplay between the public subscription IDs and the private IDs will become clear in the following communication flows, which illustrate the delivery of IPTV services to different instances of the subscriber devices. With the use of public subscription IDs and private IDs, a single public subscription ID can be used for a subscriber across different networks and subscriber devices.

The Session Initiation Protocol (SIP) or other like session control protocol is employed as a subscriber device and network independent signaling protocol for IPTV session establishment and control. As such, the overall IPTV session does not require different signaling protocols for different subscriber devices or networks. Within SIP, the Session Description Protocol (SDP) is employed to convey the communication capabilities of the particular subscriber device for a given IPTV session. Accordingly, as the capabilities of the subscriber devices change, the broadcast or video-on-demand content may be adjusted to accommodate the network supporting the subscriber device or the subscriber device itself. For example, the set-top box 16 may be able to support standard definition and high definition content, the PC 18 may be able to support substandard definition or low resolution content, and the PDA 20 may only support ultra-low resolution content. These delineations in capabilities for the subscriber devices are purely illustrative. For example, the PDA 20 may be configured to receive high definition content over an appropriate access network. Regardless, the SDP may be used to inform the multimedia subsystem and IPTV application of the capabilities the device may support during a requested session.

Further, the present invention may employ the SIP Subscribe/Notify messaging sequence or a like messaging sequence to provide a common mechanism for requesting service data, content catalogue data, and other service or interface related information across different subscriber devices and networks. Depending on the subscriber device or supporting network, the actual service data, content catalogue data, or the like is ultimately conveyed to the subscriber device in a manner best suiting the subscriber device. For example, a Subscribe message may be used to request the desired data, and the Notify message may be used to provide information on how the subscriber device can receive the requested data. The Notify message may instruct the subscriber device to listen to a particular multi-cast channel to receive the data, provide a uniform resource identifier (URI) from which the data may be accessed, or include the requested data in the Notify message itself.

Figure 3A:
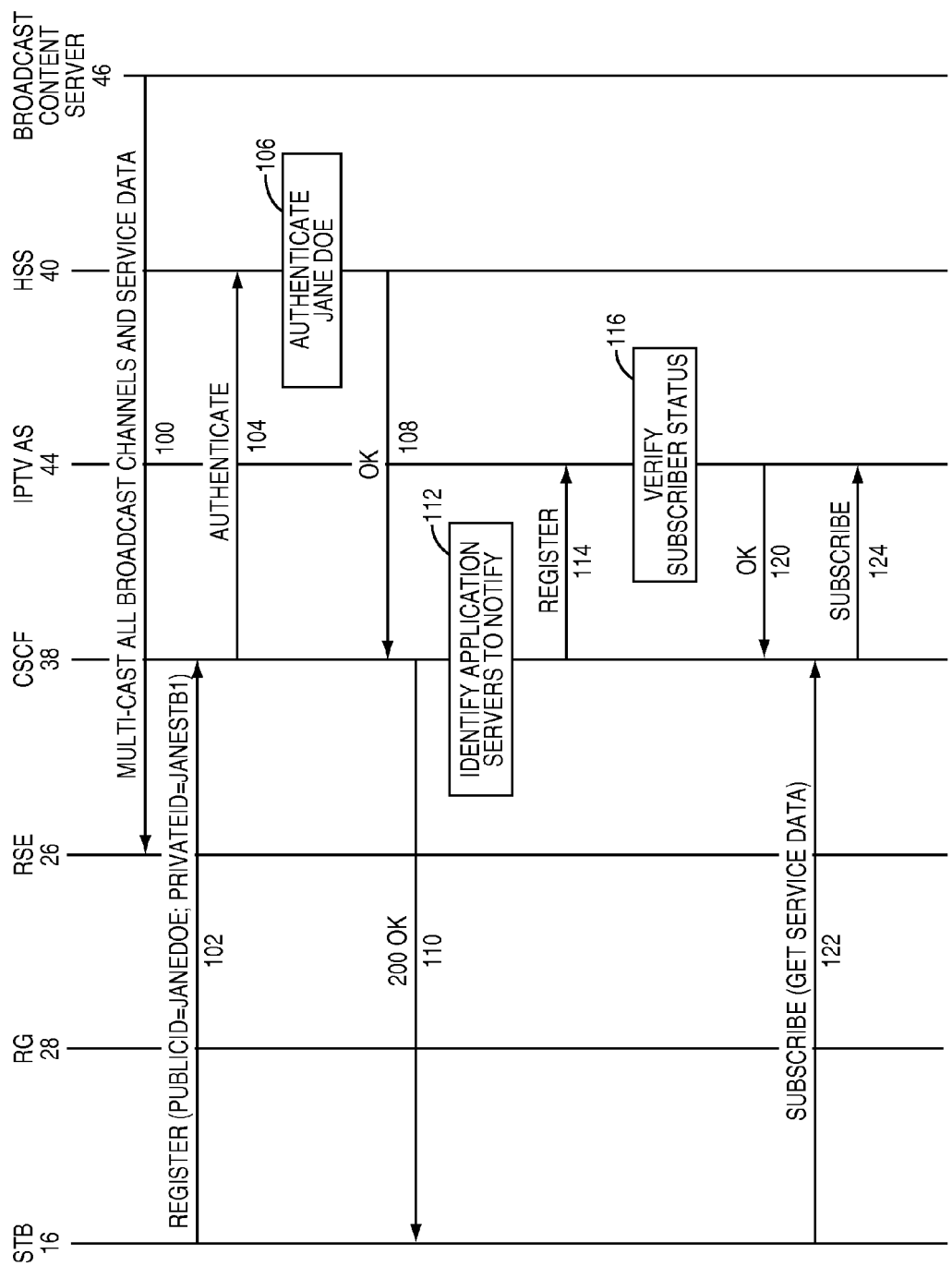
FIGS. 3A and 3B are a communication flow illustrating a registration and service initialization sequence according to one embodiment of the present invention.
Figure 3B:
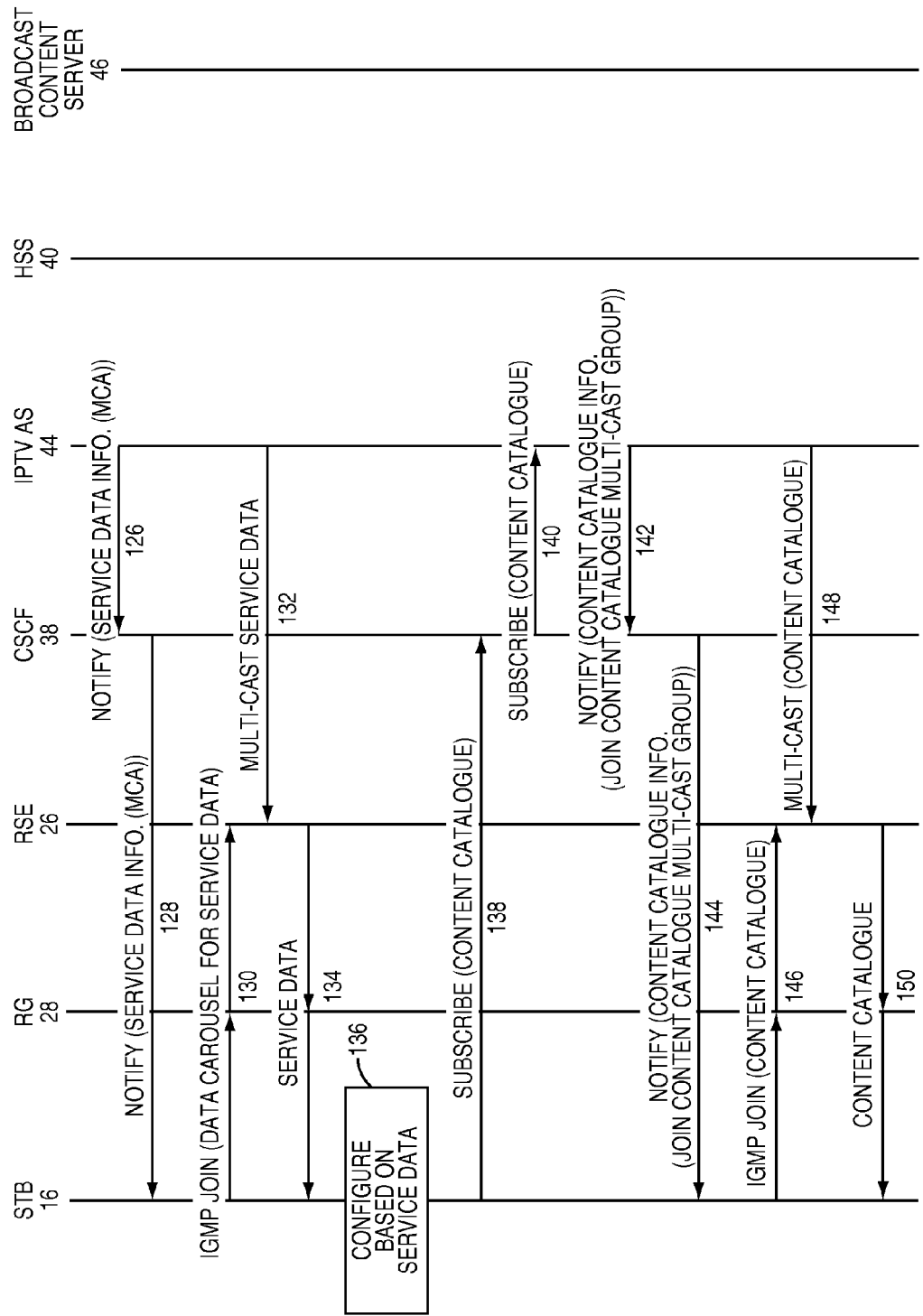

With reference to FIGS. 3A and 3B, a registration and service initialization sequence is illustrated for the set-top box 16. This example assumes that the broadband access network 24 and the set-top box 16 have already performed network attachment, whereby basic Layer 1, Layer 2, and Layer 3 connectivity have been established. During this initialization, the set-top box 16 was instructed to register with the IMS infrastructure 12, and in particular with the CSCF 38, which is providing a proxy CSCF.

Initially, assume the broadcast content server 46 is multi-casting all available broadcast channels, and perhaps certain service data, to the RSE 26 (step 100). As such, the RSE 26 receives all the broadcast channels, and when the set-top box 16 requests a channel, only a single channel is provided from the RSE 26 to the set-top box 16. Those skilled in the art will recognize other techniques for delivering the broadcast channels to the RSE 26, RG 28, and set-top box 16.

Prior to being able to receive any of the broadcast channels and provide them to the TV 30, the set-top box 16 must register with the CSCF 38 by sending a Register message to the CSCF 38 (step 102). The Register message includes a public subscriber ID and a private device ID. The Register message effectively binds the public subscriber ID with the specific private device ID corresponding to the subscriber device to be used for an IPTV session. In this case, the private device ID corresponds to the set-top box 16.

The CSCF 38 may access the HSS 40 to authenticate the subscriber. As such, the CSCF 38 may send an Authenticate message to the HSS 40 (step 104), which will take the necessary steps to authenticate the subscriber (step 106) and provide an appropriate response back to the CSCF 38. In the example illustrated in FIG. 3A, the authentication is successful, and an OK message is sent to the CSCF 38 to indicate that the subscriber was authenticated (step 108). Notably, the HSS 40 may be configured with security credentials for each private device identity, and as such, different security credentials, including different cryptography keys, may be maintained for different subscriber devices. Upon receiving an indication that the subscriber was authenticated from the HSS 40, the CSCF 38 may provide a 200 OK message to the set-top box 16 in response to the original Register message (step 110).

Once the subscriber registration is complete, the CSCF 38 may identify application servers to notify in response to the subscriber's registration (step 112). In this instance, the CSCF 38 will recognize that the given subscriber ID is provisioned with service provided by the IPTV AS 44 (and possibly other application servers). As such, the CSCF 38 will send a Register message to the IPTV AS 44 (step 114), which may verify the subscriber's status in an effort to approve the subscriber for receiving at least certain IPTV services (step 116). At this point, the IPTV AS 44 will send an OK message back to the CSCF 38 (step 120) in response to the Register message (of step 114).

Once the set-top box 16 is informed of a successful registration, application-related parameters, referred to as service data, may be requested to complete the service initialization. The mechanism through which such service data may be retrieved may vary from one subscriber device to another or from one network to another. As indicated above, SIP Subscribe/Notify messages may be used to provide a common framework to assist in the retrieval of service data. As such, any type of subscriber device over any network can use the same SIP Subscribe/Notify mechanism to aid in obtaining the service data. For the set-top box scenario, multi-cast data carousel streams may be used to convey configuration data or like service data in a highly efficient and scalable manner. The SIP Notify message, which is provided in response to a SIP Subscribe message, can convey a multi-cast address to which the set-top box 16 may listen to receive the service data. In other scenarios, the service data may need to be provided through an appropriate document, such as a web page. In these cases, the SIP Notify message may include a URI pointing to an appropriate document. In other embodiments, the SIP Notify message may actually include the service data, instead of providing information for readily obtaining the service data. Subsequent SIP Notify messages may be provided on a periodic basis to deliver updated service data. The SIP Subscribe/Notify mechanism may also be used to request and provide content catalogue information. A content catalogue is a set of metadata describing content which may be available to the subscriber. Those skilled in the art may recognize an electronic program guide (EPG) as a type of content catalogue with specific scope. The communication flow of FIGS. 3A and 3B illustrates separate requests for retrieving service data and content catalogue information.

To obtain the service data, the set-top box 16 will send a Subscribe message configured to obtain service data to the CSCF 38 (step 122). The CSCF 38 will forward the Subscribe message to the IPTV AS 44 (step 124), which will create service data information and provide the service data information back to the CSCF 38 in a Notify message (step 126). The service data information in this example is not the service data itself, but rather a multi-cast address (MCA). The multi-cast address can be used by the set-top box 16 to listen for the actual service data, which is delivered in multi-cast service data streams. The CSCF 38 will provide the service data information in a Notify message to the set-top box 16 (step 128). Armed with the multi-cast address for the service data, the set-top box 16 may use the Internet Group Management Protocol (IGMP) to send an IGMP Join message to the RSE 26 via the RG 28 (step 130). The IGMP Join message will effectively instruct the RSE 26 to deliver the multi-cast service data that is being received from the IPTV AS 44 (step 132) to the set-top box 16. Accordingly, the RSE 26 will send the service data to the set-top box 16 via the RG 28 (step 134), wherein the set-top box 16 will identify the appropriate service data based on the multi-cast address provided in the service data information. Notably, the multi-cast channels for the service data may be provided to the RG 28 instead of just to the RSE 26, wherein interaction by the set-top box 16 to obtain the service data or content catalogue information may occur directly with the RG 28 instead of the RSE 26. Based on the received service data, the set-top box 16 will configure itself based on the service data (step 136).

Next, assume the subscriber, or at least the set-top box 16, requires a content catalogue. The set-top box 16 will send a Subscribe message for a content catalogue to the CSCF 38 (step 138). Again, the CSCF 38 will send a Subscribe message to the IPTV AS 44 (step 140), which will obtain an indirect reference to the appropriate content catalogue information which is passed through the CSCF 38 in a Notify message (step 142) to the set-top box 16 (step 144). In this case the indirect reference is a description of a multi-cast group which the set-top box 16 will join to retrieve content catalogue data.

Based on multi-cast group information received in the Notify message, the set-top box 16 may send an IGMP Join message to the RSE 26 via the RG 28 to instruct the RSE 26 to deliver the actual content catalogue to the set-top box 16 (step 146). Since the multi-cast content catalogue is continuously being delivered to the RSE 26 (step 148), the RSE 26 will begin delivering the content catalogue to the set-top box 16 via the RG 28 (step 150).

From the above, the service data and the content catalogue may not be obtained using SIP; however, the SIP Subscribe/Notify mechanism is used to obtain sufficient information to retrieve the actual service data or content catalogue. As such, different subscriber devices may use different protocols to obtain the service data or content catalogue, but use the common Subscribe/Notify mechanism to determine how to obtain such information. Therefore, consistent with the purpose of this invention, a common platform is provided among different subscriber devices and networks to aid in instructing the subscriber devices on how to obtain the service data and content catalogue.

Figure 4A:
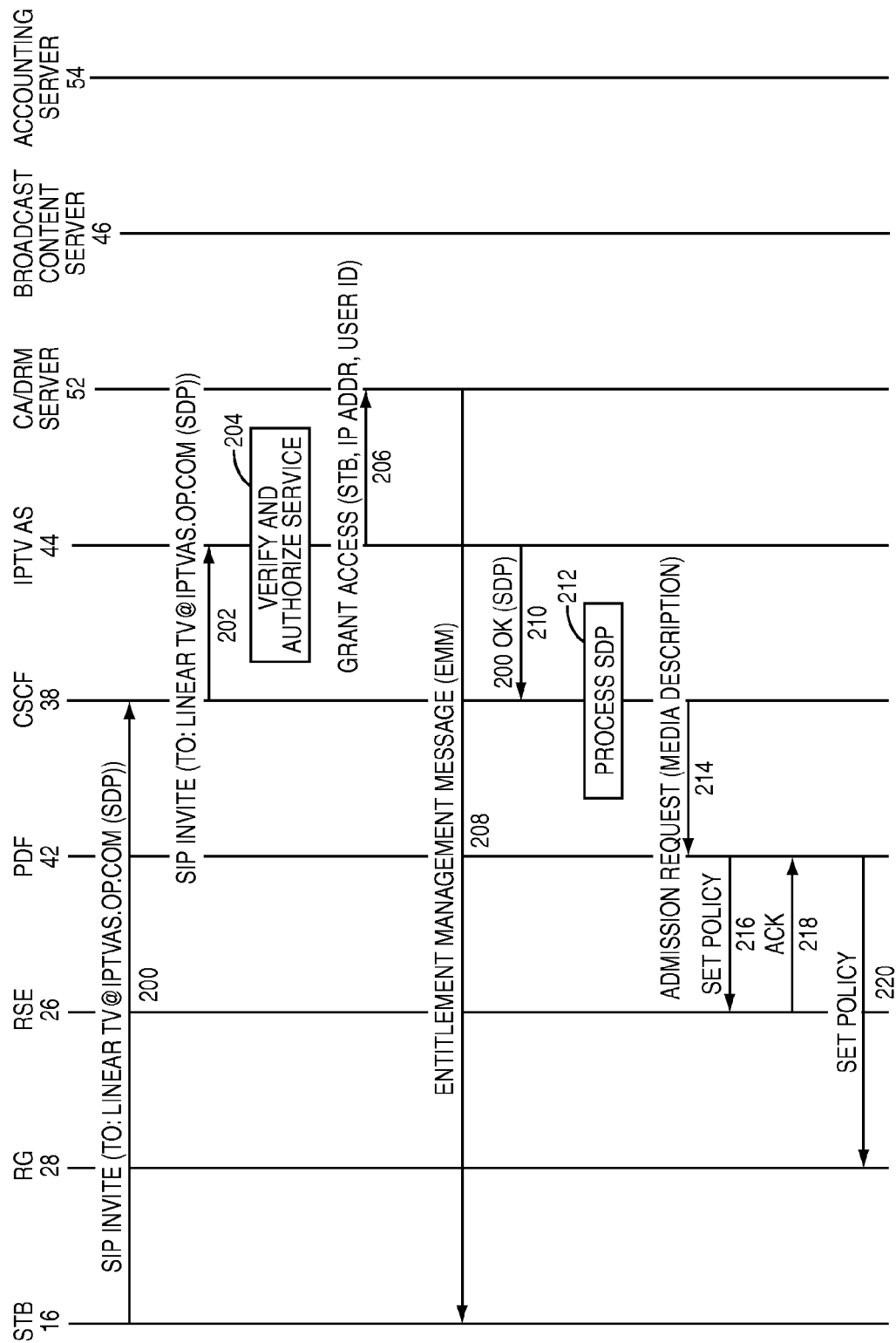
FIGS. 4A and 4B are a communication flow illustrating initiation of an IPTV session, along with the delivery and control of broadcast video content according to one embodiment of the present invention.
Figure 4B:
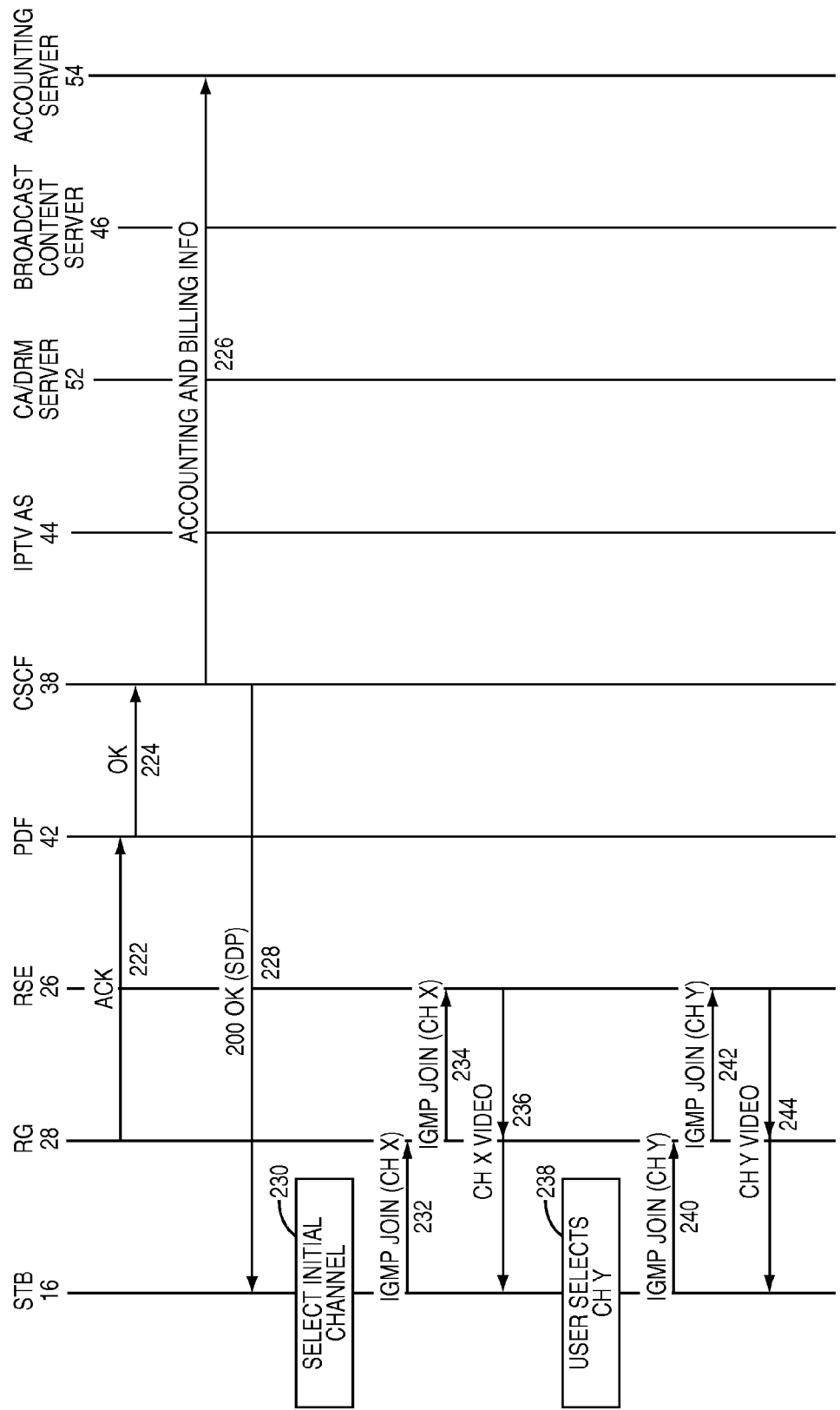

Turning now to FIGS. 4A and 4B, a communication flow is provided to illustrate initiation of an IPTV session, along with the delivery and control of broadcast video content. Once the registration process is complete, the set-top box 16 may initiate an IPTV session by sending a SIP Invite message toward the CSCF 38 (step 200). The SIP Invite message is addressed to an address of record or public service identity defined by the multimedia subsystem provider for the broadcast television service, and is associated with the IPTV AS 44. The address of record or public service identity may have been conveyed via the previously obtained service data or from data included in the content catalogue. The SDP of the SIP Invite message may include a complete description of the capabilities of the set-top box 16, including video encoder supported, framerates supported, stream control protocols supported, transport protocols supported, and other capabilities. The CSCF 38 will receive the SIP Invite message, and based on the address of record or public service identity, forward the SIP Invite message to the IPTV AS 44 (step 202). The IPTV AS 44 will verify and authorize service for the subscriber (step 204).

In response, the IPTV AS 44 may send a message to the CA/DRM server 52 to instruct the CA/DRM server 52 to grant access to the encrypted broadcast video content received by the set-top box 16 (step 206). The CA/DRM server 52 may send an Entitlement Management message (EMM) to the set-top box 16 to provide the requisite cryptography keys or other information required by the set-top box 16 to properly decrypt or decode the broadcast video content (step 208). Upon completing any necessary service authorization activities, the IPTV AS 44 will send a 200 OK message back to the CSCF 38 (step 210). The IPTV AS 44 will include the SDP associated with the IPTV session that is being established. The SDP information provided by the IPTV AS 44 will correspond to that capable of being supported by the set-top box 16, consistent with the subscriber's subscription parameters and supported by the broadcast content server 46. The CSCF 38 may process the SDP information provided by the IPTV AS 44 (step 212), and send an Admission Request message to the PDF 42 (step 214). The Admission Request message will include a media description for the upcoming IPTV service in light of the SDP provided by the IPTV AS 44. In response, the PDF 42 will apply any applicable service policies and may send a Set Policy message to the RSE 26 (step 216) to identify the authorized flow(s), allocate resources, set class of service, etc. for the media flows and control protocols associated with the IPTV session that were specified in the SDP in step 210.

The RSE 26 will reserve the requested resources, apply other policy actions and send an Acknowledgement (ACK) message back to the PDF 42 (step 218). Similarly, the PDF 42 may send a Set Policy message to the RG 28 to identify the authorized flow(s), allocate resources, set class of service, open firewall pinholes, create network address translation (NAT) binds, and the like, for the media flows and control protocols associated with the IPTV session as specified in the media description (step 220). The RG 28 will reserve the necessary resources, apply other policy actions and respond with an ACK message (step 222). Once the RSE 26 and the RG 28 have responded to the respective Set Policy messages, the PDF 42 will send an OK message back to the CSCF 38 (step 224). After any necessary accounting or billing reporting necessary in light of the IPTV session, the CSCF 38 may send the requisite accounting and billing information to the accounting server 54 for further processing (step 226). At this point, the CSCF 38 can respond to the original SIP Invite message (of step 200) by sending a 200 OK message to the set-top box 16 (step 228). The 200 OK message will include the SDP information provided by the IPTV AS 44. The SDP information is used by the set-top box 16 for the IPTV session being established.

In the illustrated embodiment, the set-top box 16 will automatically select an initial channel from the multiple multicast channels available to the set-top box 16 (step 230). Assuming the initial channel is channel X (CH X), the set-top box 16 must request the channel from the RSE 26, and as such, the set-top box 16 will send an IGMP Join message requesting receipt of channel X to the RG 28 (step 232), which will forward the IGMP Join message to the RSE 26 (step 234). The RSE 26 will respond by sending video content for channel X to the set-top box 16 via the RG 28 (step 236). Notably, IGMP is separate from SIP, and thus, channel selection is separate from session signaling in the session control plane. In other words, the session control plane is not involved in channel changes, and the state of the broadcast television session is not impacted due to a channel change. In essence, the IPTV session facilitates full broadcast television services therein. Notably, channel change activities may be monitored and reported by the STB 16, RG 28 or RSE 26 to the IPTV AS 44 for monitoring and statistical purposes.

As such, when the subscriber desires to change channels and selects channel Y (CH Y) after viewing channel X (step 238), the set-top box 16 will respond by sending an IGMP Join message for channel Y to the RSE 26 via the RG 28 (steps 240 and 242). In response, the RSE 26 will begin delivery of video content for channel y to the set-top box 16 via the RG 28 (step 244). Again, channel changes do not affect the overall IPTV session. Thus, a single IPTV session can support any number of broadcast channels provided in a multi-cast manner.

In addition to supporting broadcast television services, the present invention is equally applicable to VoD services. In one embodiment, a separate IPTV session is established for a VoD session, wherein the IPTV session for the broadcast television services may be torn down or left active, depending on the desires of the service providers. For example, the service provider may wish to provide the capability of the subscriber reviewing a live TV event, such as a hockey goal, by means of a pause-live-TV capability implemented using an IPTV VoD service, while the subscriber continues to monitor live events as a picture-in-picture broadcast by means of a continuing active IPTV broadcast session. Alternatively, there may be a service that allows the subscriber to tune away from broadcast TV content and to select a movie from a VoD library, in which case it may be preferred to tear down the broadcast session. A communication flow illustrating establishment of an IPTV session for VoD services is provided in FIGS. 5A-5C.

Figure 5A:
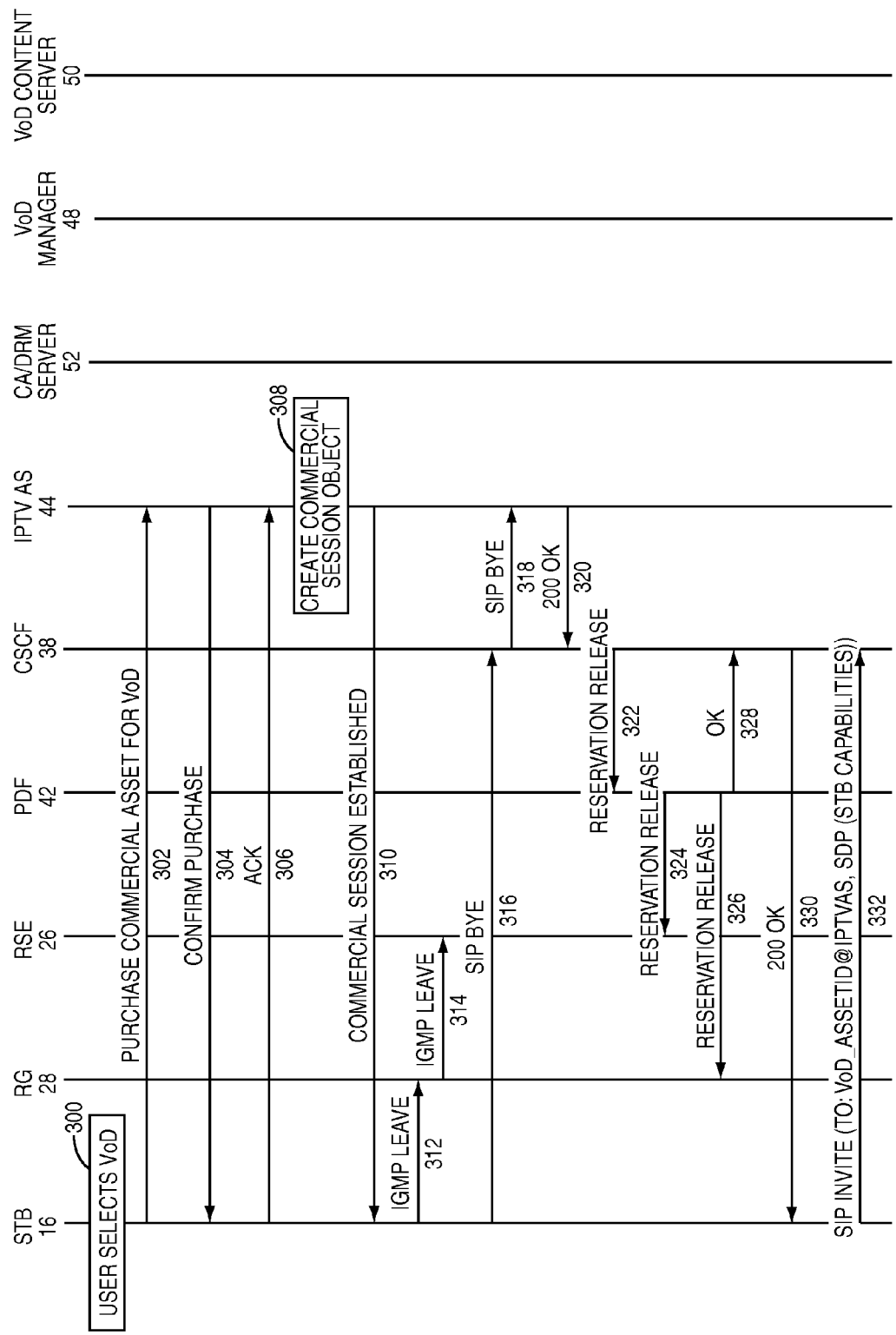
FIGS. 5A-5C are a communication flow illustrating establishment of an IPTV session for Video-on-Demand (VoD) services according to one embodiment of the present invention.
Figure 5B:
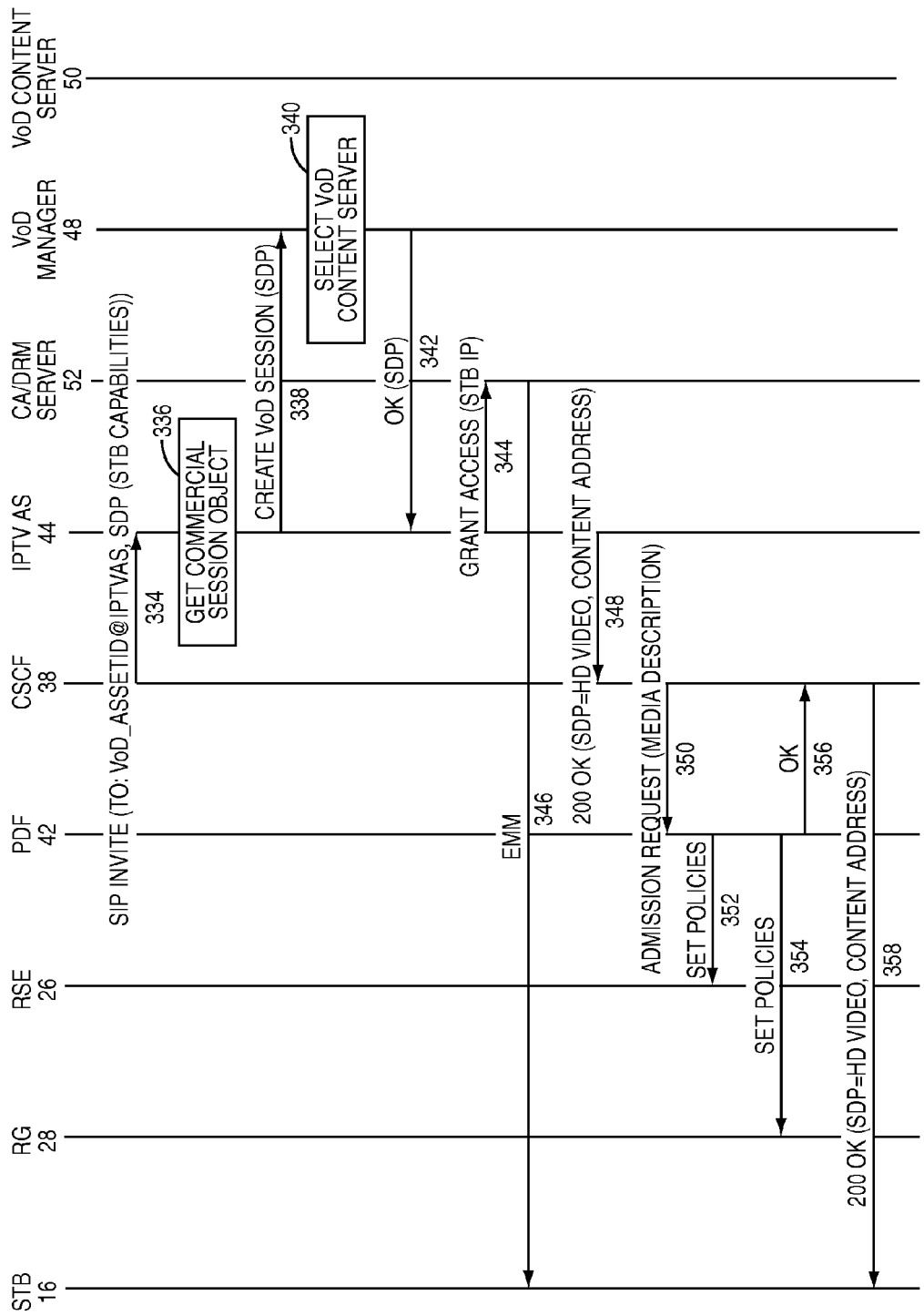
Figure 5C:
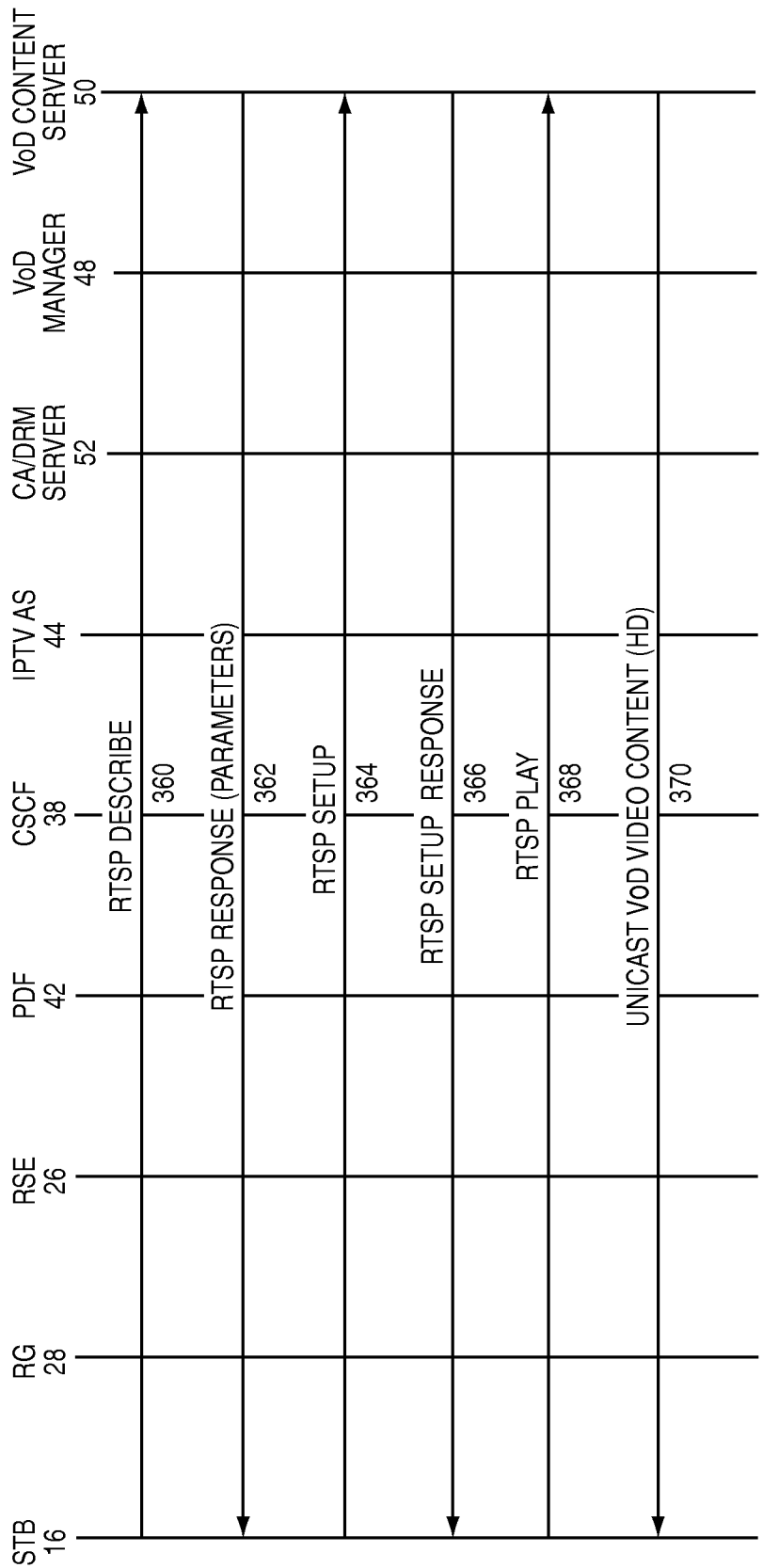

Assume that the communication flow of FIGS. 5A-5C resumes where the communication flow of FIGS. 4A and 4B left off. As such, the user may select a VoD service at the set-top box 16 (step 300), which will respond by sending a message to the IPTV AS 44 to purchase a commercial asset for a VoD service (step 302). The IPTV AS 44 will respond by verifying and authorizing the subscriber request and will provide a purchase confirmation back to the set-top box 16 (step 304). The set-top box 16 may acknowledge receipt of the purchase confirmation message (step 306), wherein the IPTV AS 44 will create a commercial session object corresponding to the requested VoD session (step 308). The commercial session is effectively an authorization for the subscriber to view the commercial asset according to the terms of the purchase. The commercial session, for example, may last for a 24-hour period within which the particular content associated with the commercial asset may be viewed any number of times or from any number of devices belonging to the subscriber. The IPTV AS 44 will then send a message indicating that a commercial session has been established to the set-top box 16 (step 310).

At this point, the set-top box 16 will take the necessary steps to end the prior broadcast IPTV session by sending an IGMP Leave message to the RG 28 (step 312), which will forward the IGMP Leave message to the RSE 26 (step 314). At this point, the set-top box 16 has instructed the RSE 26 to stop sending the video content for channel Y. To end the overall IPTV broadcast session, the set-top box 16 will send a SIP Bye message to the CSCF 28 (step 316), which will forward the SIP Bye message to the IPTV AS 44 (step 318). The IPTV AS 44 will respond with a 200 OK message (step 320), which when received by the CSCF 38 will cause the CSCF 38 to instruct the PDF 42 to release the resource reservations and other policy rules made for the broadcast IPTV session (step 322). The PDF 42 will send an appropriate resource reservation release message to the RSE 26 (step 324) as well as to the RG 28 (step 326) to cancel the resource reservations for the broadcast IPTV session. Once the revised policy settings have been established, the PDF 42 will send an OK message back to the CSCF 38 (step 328). The CSCF 38 will forward the 200 OK message received from the IPTV AS 44 to the set-top box 16 (step 330), wherein the broadcast IPTV session ends.

In an exemplary embodiment, to initiate the VoD IPTV session corresponding to the established commercial session, the set-top box 16 will send a SIP Invite message addressed to a URI comprised of two parts: a part that uniquely identifies the target IPTV AS 44 within the set of application servers that are known to the CSCF 38, and a part that uniquely identifies the VoD asset within the set of VoD assets that are known to the VoD Manager 48. In an alternative embodiment, the URI may describe only the asset, leaving the multimedia subsystem to perform the appropriate mapping to the appropriate IPTV AS 44 responsible for managing the asset. The SIP Invite message is received by the CSCF 38 (step 332), which will recognize that the VoD asset URI contained in the SIP Invite needs to be forwarded to the IPTV AS 44 (step 334). The SIP Invite message will be directed to the IPTV AS 44 and identify the VoD asset, or program, that was selected by the user. The SDP within the SIP Invite message will include the communication capabilities of the set-top box 16, including video encoders, supported framerates, supported transport layer protocols, supported stream control protocols (e.g. RTSP), etc. The IPTV AS 44 will recognize that the VoD asset referenced in the SIP URI of the SIP Invite corresponds to the commercial session object previously created and upon retrieving the commercial session object (step 336) will validate that the requested viewing session is consistent with the commercial agreement described therein. The IPTV AS 44 will request that the VoD manager 48 create a VoD IPTV session for the VoD asset that is associated with the commercial session object (step 338). The request will include the SDP that was sent from the set-top box 16. The VoD manager 48 will select the appropriate VoD content server 50 to provide the VoD video content associated with the VoD asset (step 340), and provide this information to the IPTV AS 44 in addition to the SDP for the VoD content (step 342).

The IPTV AS 44 will then instruct the CA/DRM server 52 to grant access for the VoD asset to the set-top box 16 (step 344). The CA/DRM server 52 will send an appropriate EMM to the set-top box 16 (step 346), which will use the keys or other information provided in the EMM to properly receive the VoD video content. Meanwhile, the IPTV AS 44 will send a 200 OK message to the CSCF 38 (step 348). Again, the 200 OK message will include the SDP, which identifies the media characteristics, including video codec, framerates, stream control parameters and protocols, etc. of the VoD content being requested as well as an address for the VoD content server 50.

The CSCF 38 will then send an Admission Request, including the appropriate media description, to the PDF 42 (step 350). The PDF 42 will apply any applicable service usage policies and may send appropriate messages to both the RSE 26 and the RG 28 to set the appropriate resource policies for the upcoming VoD IPTV session (steps 352 and 354). Once the PDF 42 has authorized admission and the resource policies are installed, the PDF 42 will send an OK message back to the CSCF 38 (step 356). Upon receiving an indication that admission is authorized, the CSCF 38 will send the 200 OK message to the set-top box 16 (step 358), which will recognize from the SDP the characteristics of the video content associated with the VoD IPTV session and the content address from which to request the VoD video content. In this instance, assume the SDP indicates that the requested VoD video content is high definition video content. The set-top box 16 will send an appropriate request to initiate content playback to the VoD content server 50 using the content address embedded in the received SDP. This request may be issued via a streaming media control protocol such as the Real-Time Session Protocol (RTSP). In this embodiment, an RTSP Describe is sent to the video content server 50 referencing an RTSP URI identifying the VoD asset (step 360). The video content server 50 returns a full description of all RTSP parameters which are supported to the set-top box 16 (step 362). The set-top box 16 issues an RTSP Setup to complete the establishment procedures to the VoD Content server 50 (step 364), which responds in kind (step 366). Lastly, the set-top box 16 issues an RTSP Play message to request streaming from the VoD content server 50 (step 368). The VoD content server 50 will then begin sending a unicast video stream of the VoD video content to the set-top box 16 (step 370). In an alternative embodiment, steps 316 through 330, which release a prior session, may be performed prior to initiating the VoD IPTV session (step 300).

From the above, broadcast and VoD IPTV sessions may be established with a set-top box 16 under the overall control of the IMS infrastructure 12. These services may also be provided to the PC 18 over the broadband access network 24 or over the local access network 32. In this instance, the PC 18 is coupled to the broadband access network 24 and receiving service therefrom. Further, the subscriber may request both broadcast and VoD IPTV services from the PC 18 under the same subscription service under which the broadcast and VoD IPTV services were received at the set-top box 16.

Figure 6A:
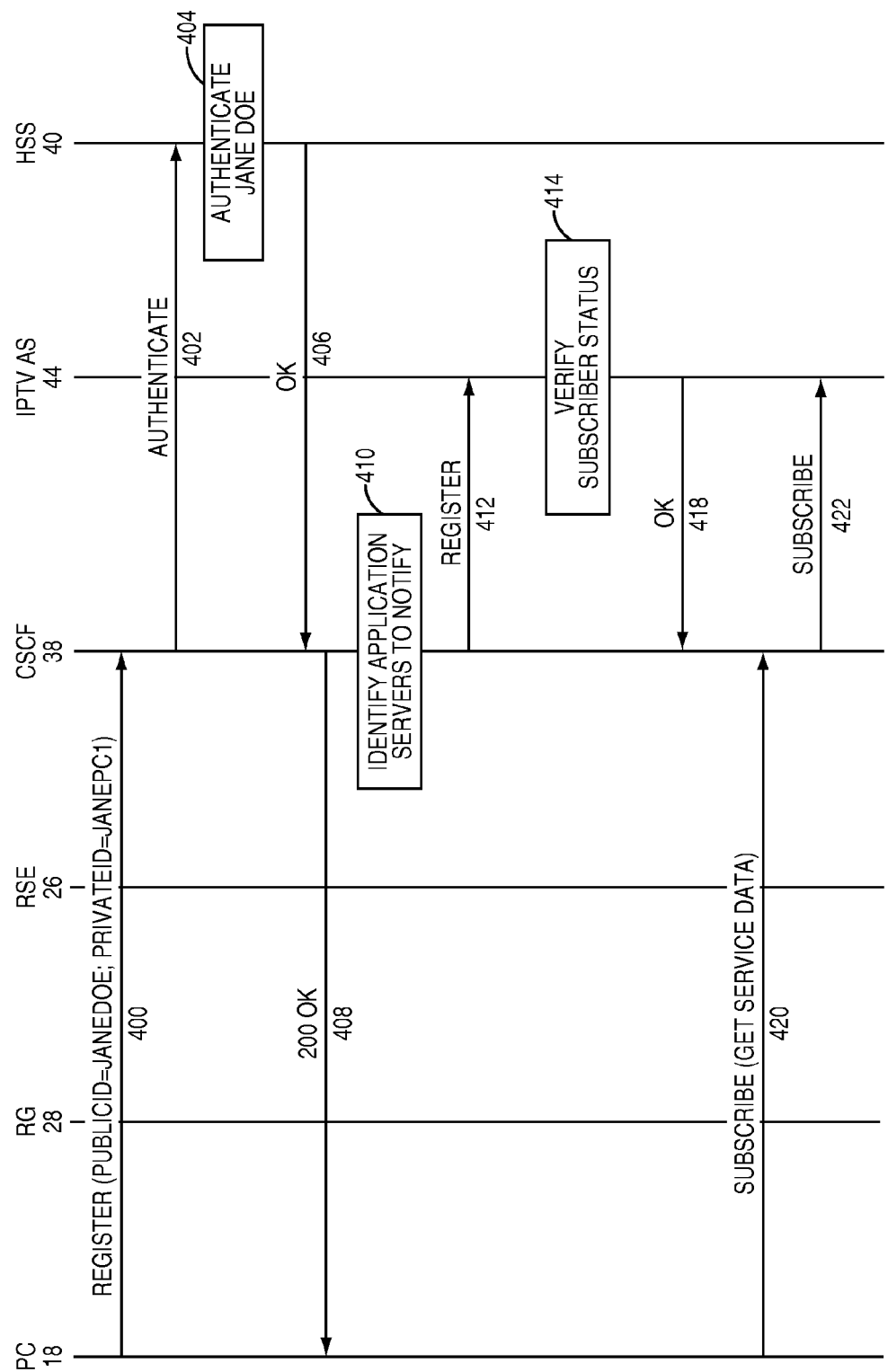
FIGS. 6A and 6B are a communication flow illustrating a registration and initialization process for receiving IPTV services at a personal computer according to one embodiment of the present invention.
Figure 6B:
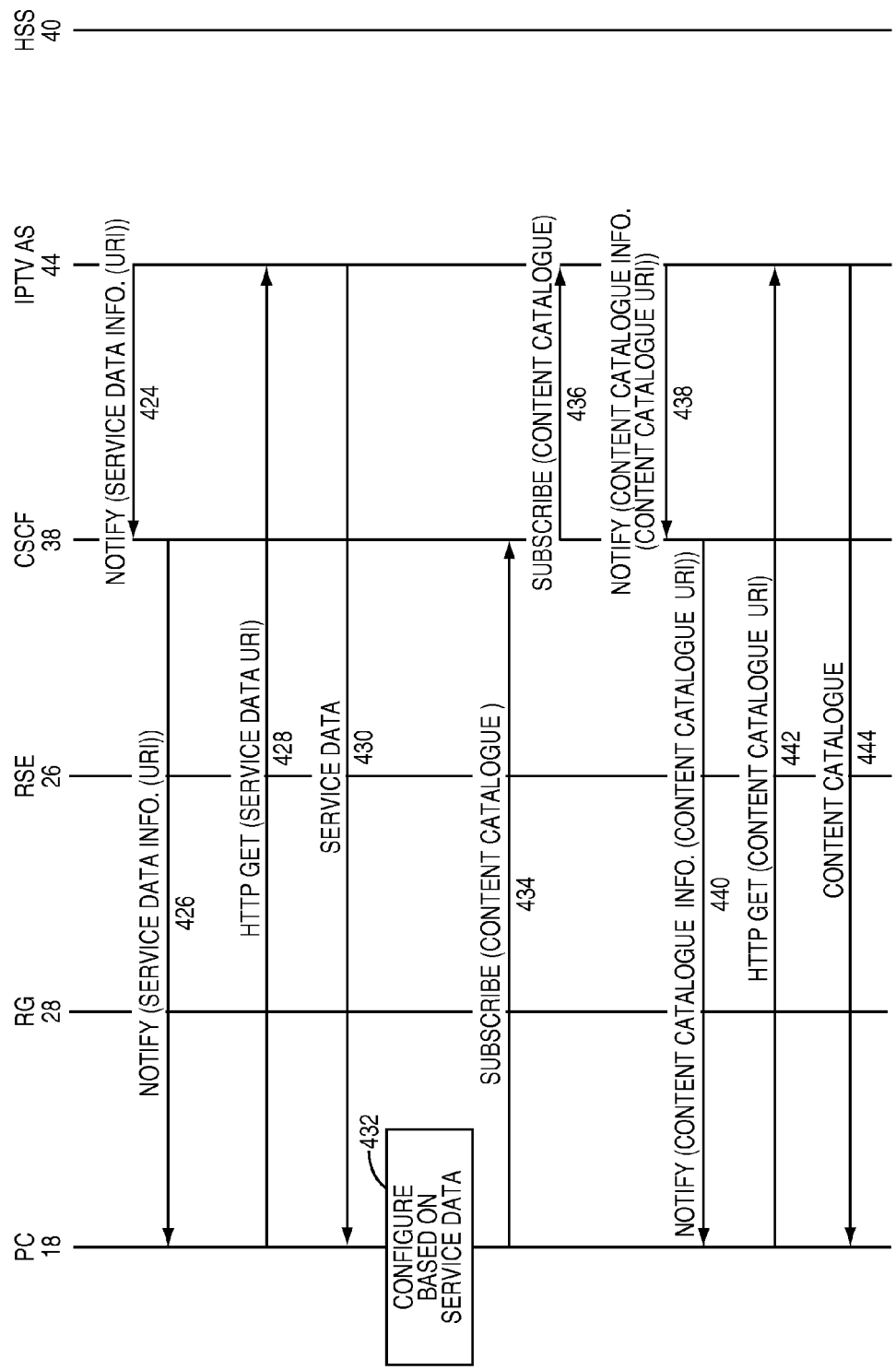

With reference to FIGS. 6A and 6B, a registration and initialization process for receiving IPTV services via the PC 18 is provided. Initially, the PC 18 will send a Register message to the CSCF 38 (step 400). Notably, the public subscription ID is JANEDOE, the same as that used to register the set-top box 16. The difference in this case is that the private device ID has changed to JANEPC1, which is the private device ID uniquely associated with the PC 18. The CSCF 38 will request authentication from the HSS 40 (step 402), which will authenticate the subscription for Jane Doe and the association of the private device ID with the public subscription ID (step 404). Once authentication is complete, the HSS 40 will send an OK message back to the CSCF 38 (step 406), which will send a 200 OK message back to the PC 18 in response to the Register message to indicate that registration is complete (step 408).

Based on the registration, the CSCF 38 will identify any application servers to notify in light of the registration for Jane Doe (step 410). In this instance, the CSCF 38 will recognize that the IPTV AS 44 should be notified of Jane Doe's registration, and as such, the CSCF 38 will send a Register message to the IPTV AS 44 (step 412). The IPTV AS 44 will verify the subscriber status of Jane Doe (step 414). At this point, the IPTV AS 44 will send an OK message back to the CSCF 38 (step 418) in response to the Register message (of step 412).

At this point, the PC 18 may take the necessary steps to obtain service data in a similar fashion to those used by the set-top box 16. In this instance, assume the PC 18 cannot join a multi-cast group to receive the service data or the content catalogue. As such, the PC 18 will send a Subscribe message to the CSCF 38 to obtain the service data (step 420). The CSCF 38 will forward the Subscribe message to the IPTV AS 44 (step 422), which instead of providing a multi-cast address from which the service data can be obtained, will provide a URI from which the service data may be obtained. The service data information including the URI is provided in a Notify message back to the CSCF 38 (step 424), which will forward the Notify message including the service data information to the PC 18 (step 426). Notably, the SIP Subscribe/Notify mechanism is used to efficiently obtain information for the subscriber's device, in this case the PC 18, to obtain the service data. The PC 18 will send a Hypertext Transfer Protocol (HTTP) Get message with the service data URI (step 428) to obtain the actual service data, perhaps in the form of a web page, from the IPTV AS 44 (step 430). Upon receipt of the service data, the PC 18 may configure itself based on the service data (step 432), and then begin the process for obtaining the content catalogue.

Again, the Subscribe/Notify mechanism is used to obtain a URI for the content catalogue from the IPTV AS 44. The PC 18 will send a Subscribe message for a content catalogue to the CSCF 38 (step 434), which will forward the Subscribe message to the IPTV AS 44 (step 436). Since it is assumed that the PC 18 cannot join a multi-cast group to obtain the content catalogue, the IPTV AS 44 will provide a URI from which a content catalogue can be obtained. The IPTV AS 44 will then send the content catalogue information including the content catalogue URI in a Notify message to the CSCF 38 (step 438), which will forward the Notify message to the PC 18 (step 440). The PC 18 will use the content catalogue URI to send an HTTP Get message to the IPTV AS 44 (step 442), which will respond by sending the content catalogue in an appropriate web page or other document to the PC 18 (step 444). Those skilled in the art will recognize that the PC 18 may be able to subscribe to multi-cast groups for service data as well as the content catalogue. The example afforded in FIGS. 6A and 6B is merely provided to illustrate an alternative mechanism for obtaining service data or the content catalogue using a common Subscribe/Notify mechanism, which is applicable over different types of subscriber devices or networks and is compatible when the service data or content catalogue is provided in different ways depending on the subscriber device or the network supporting the subscriber device.

Figure 7A:
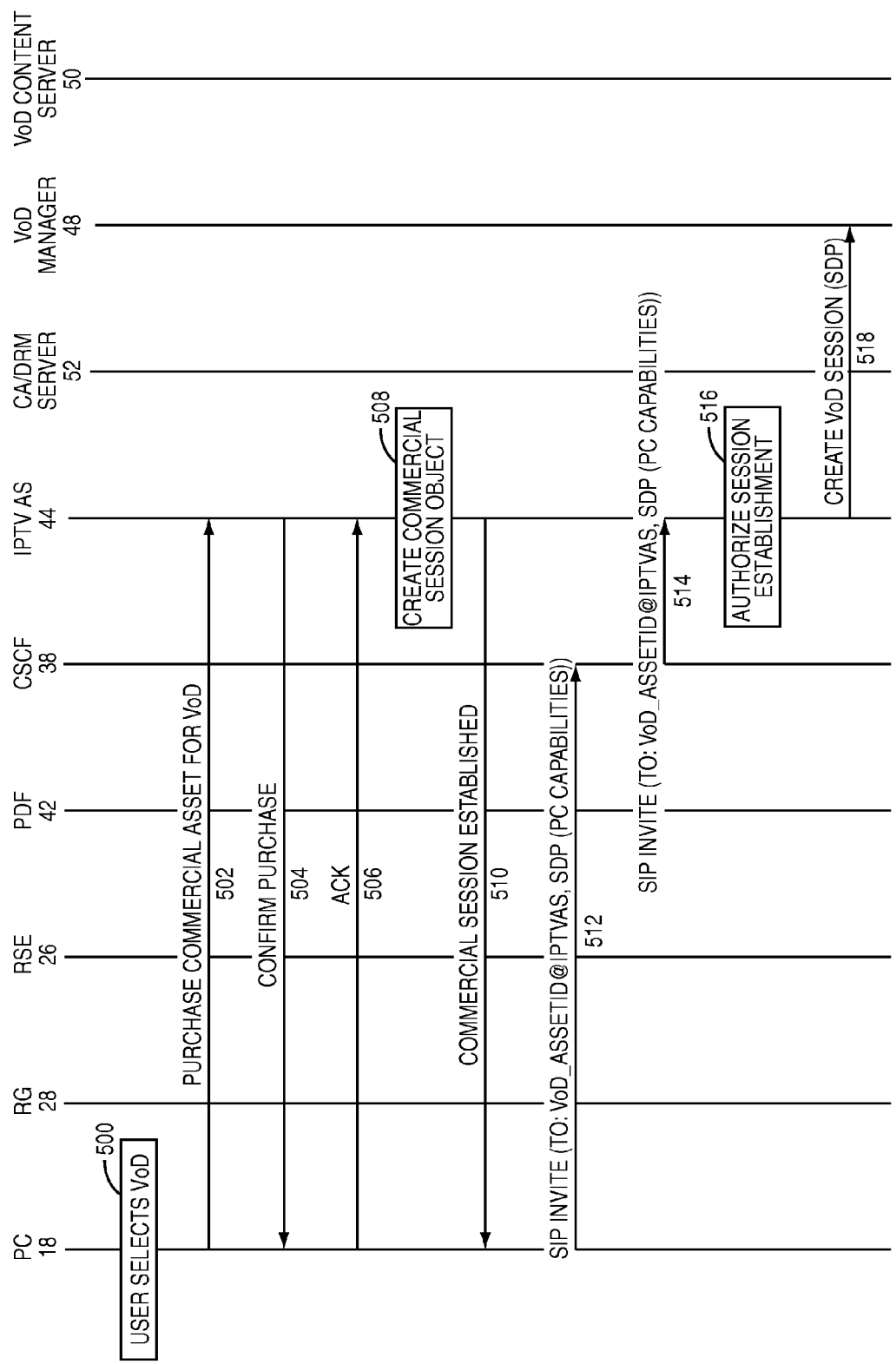
FIGS. 7A-7C are a communication flow illustrating establishing a VoD IPTV session at a personal computer according to one embodiment of the present invention.
Figure 7B:
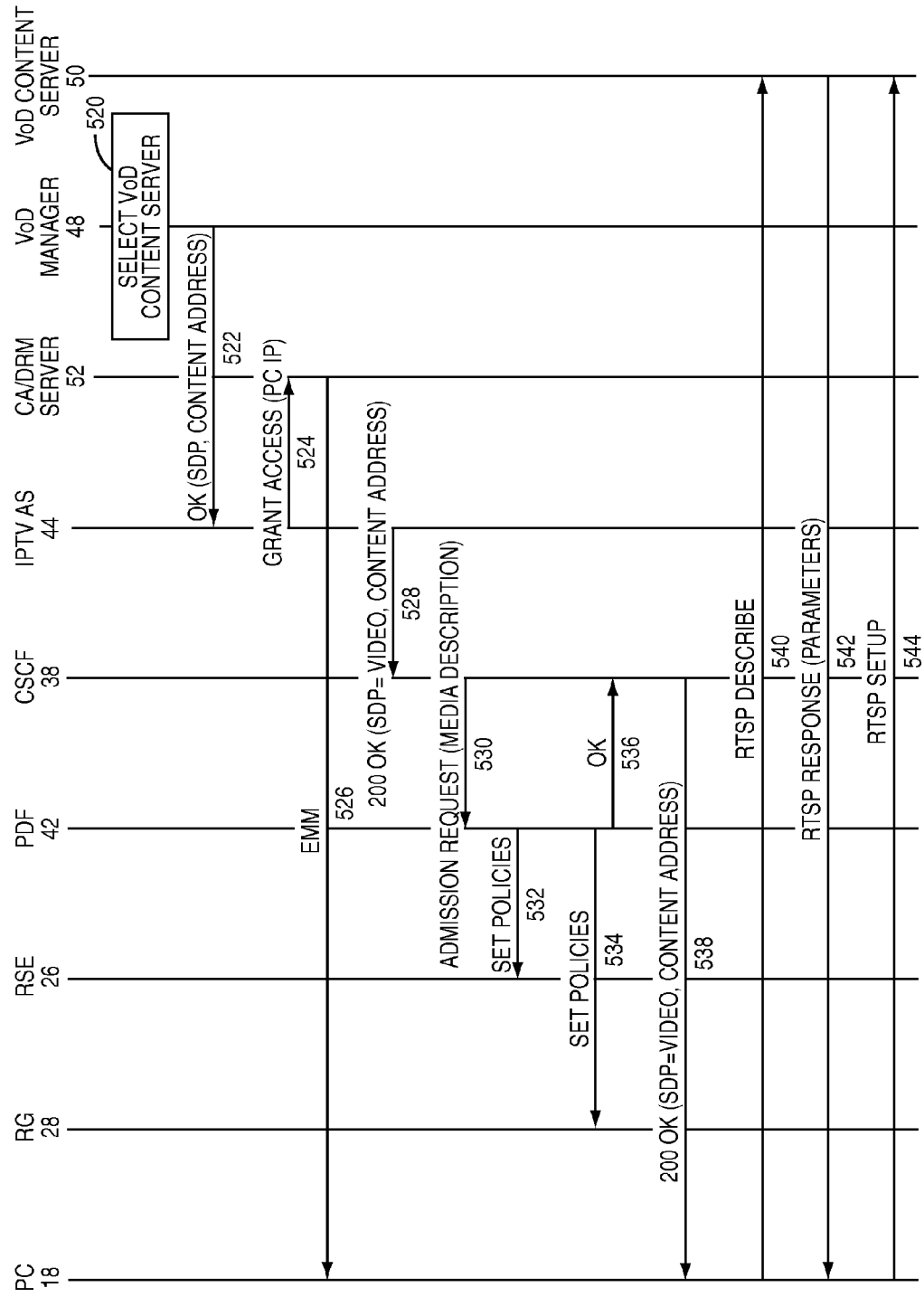
Figure 7C:
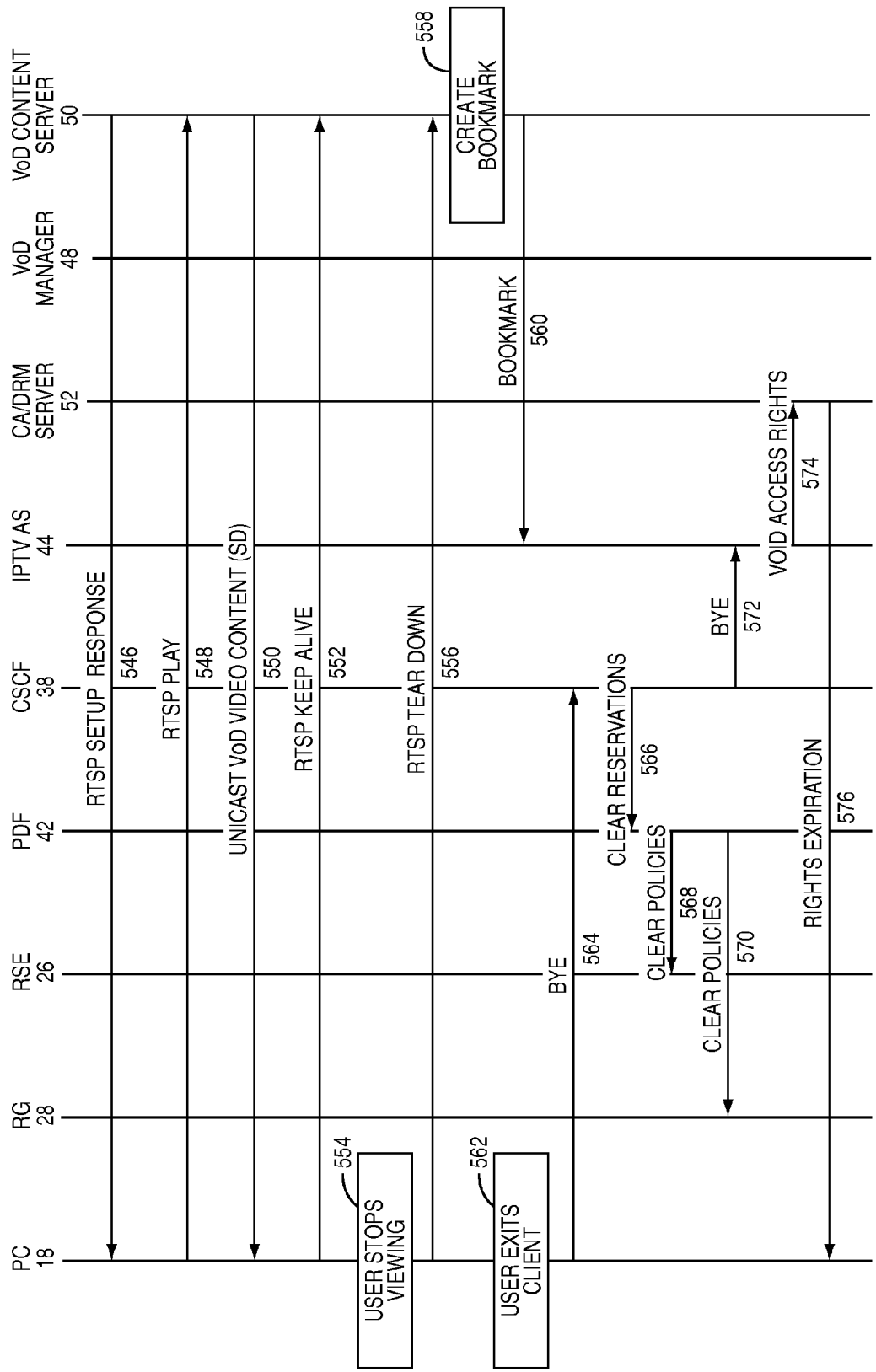

With reference to FIGS. 7A-7C, a communication flow is provided to illustrate establishing a VoD IPTV session at the PC 18. Initially, the user will select a VoD session (step 500), and the PC 18 will send a message to purchase a commercial asset for the requested VoD IPTV session to the IPTV AS 44 (step 502). The IPTV AS 44 may then send a message confirming the purchase of the commercial asset for the requested VoD IPTV session to the PC 18 (step 504). The PC 18 may acknowledge confirmation of the purchase (step 506), wherein the IPTV AS 44 will create a commercial session object for the requested VoD Asset (step 508). The IPTV AS 44 will send a message to the PC 18 indicating that the commercial session has been established (step 510).

Next, the PC 18 will send a SIP Invite to initiate the VoD IPTV session. The SIP Invite will be addressed to a URI identifying the VoD asset being purchased, and the SDP of the SIP Invite message will identify the communication capabilities of the PC 18. The SIP Invite message is initially routed to the CSCF 38 (step 512), which will determine that the VoD Asset URI is associated with the IPTV AS 44, and will forward the SIP Invite accordingly (step 514). The IPTV AS 44 uses the information contained in the SIP Invite message to authorize the session establishment (step 516), and sends a message to create a VoD IPTV session to the VoD manager 48 (step 518). Based on the VoD asset and, in some instances of the application of the invention, the capabilities of the subscriber device as described in the SDP, the VoD manager 48 will select an appropriate VoD content server 50 from which the VoD content associated with the VoD asset will be provided (step 520). The VoD manager 48 will send an OK message back to the IPTV AS 44 (step 522), wherein the SDP associated with the VoD content is provided in the OK message. The OK message will also identify the content address for receiving the VoD content from the selected VoD content server 50. The IPTV AS 44 will instruct the CA/DRM server 52 to grant access for the VoD IPTV session (step 524). In response, the CA/DRM server 52 will provide an EMM to the PC 18 (step 526).

The IPTV AS 44 will then send a 200 OK message with the SDP for the VoD content to be provided as well as the content address for the VoD content to the CSCF 38 (step 528). The CSCF 38 will send an Admission Request to the PDF 42 (step 530), which will take the necessary steps to set the resource policies with the RSE 26 and the RG 28 (steps 532 and 534). Once the RSE 26 and the RG 28 have installed the resource policies for the VoD IPTV session to the PC 18, an OK message is sent to the CSCF 38 from the PDF 42 (step 536). The CSCF 38 will then send a 200 OK message to the PC 18 (step 538), wherein the PC 18 can use the content address provided in the 200 OK message to request delivery of the VoD content from the VoD content server 50, utilizing a streaming media control protocol such as the Real-Time Session Protocol (RTSP). In this embodiment, an RTSP Describe is sent to the video content server 50 referencing an RTSP URI identifying the VoD asset (step 540). The video content server 50 returns a full description of all RTSP parameters which are supported to the PC 18 in an RTSP Response message (step 542). The PC 18 issues an RTSP Setup to complete the establishment procedures to the VoD Content server 50 (step 544), which responds in kind (step 546). Lastly, the PC 18 issues an RTSP Play message to request streaming from the VoD content server 50 (step 548). The VoD content server 50 will then begin sending a unicast video stream of the VoD video content to the PC 18 (step 550). Notably, the VoD video content being provided to the PC 18 is standard definition (SD) content, instead of the high definition (HD) content sent to the set-top box 16 in the prior example. The SDP provided in the 200 OK message (of step 538) will instruct the PC 18 of the communication parameters necessary to receive the VoD video content. The PC 18 may use various RTSP messages to control delivery of the VoD content from the VoD content server 50. Further, the PC 18 may send periodic RTSP Keep Alive messages to the VoD content server 50 to indicate that the PC 18 is still active and capable of receiving the VoD content (step 552).

Figure 8A:
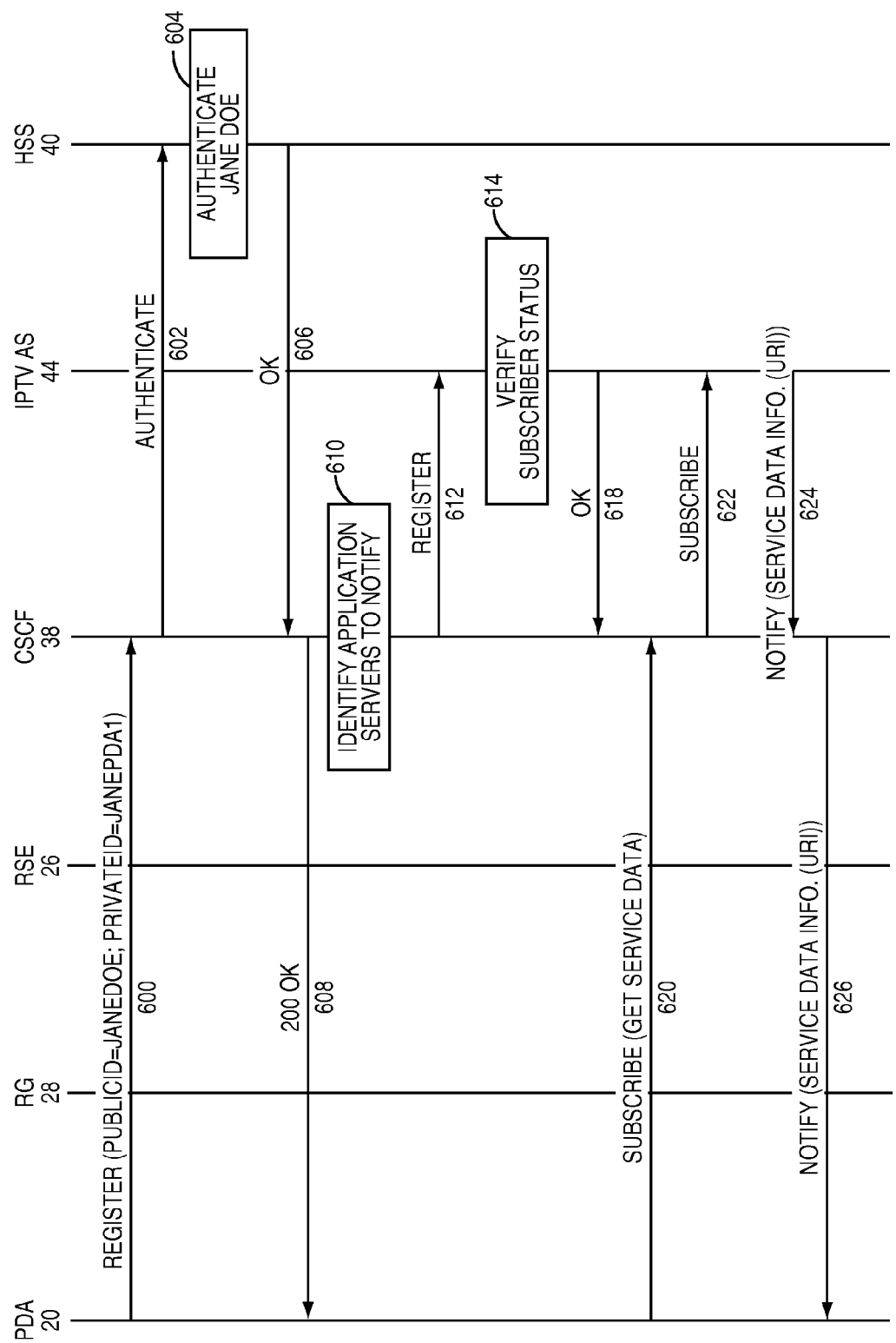
FIGS. 8A and 8B are a communication flow illustrating registration and initialization of IPTV services via a personal digital assistant (PDA) according to one embodiment of the present invention.
Figure 8B:
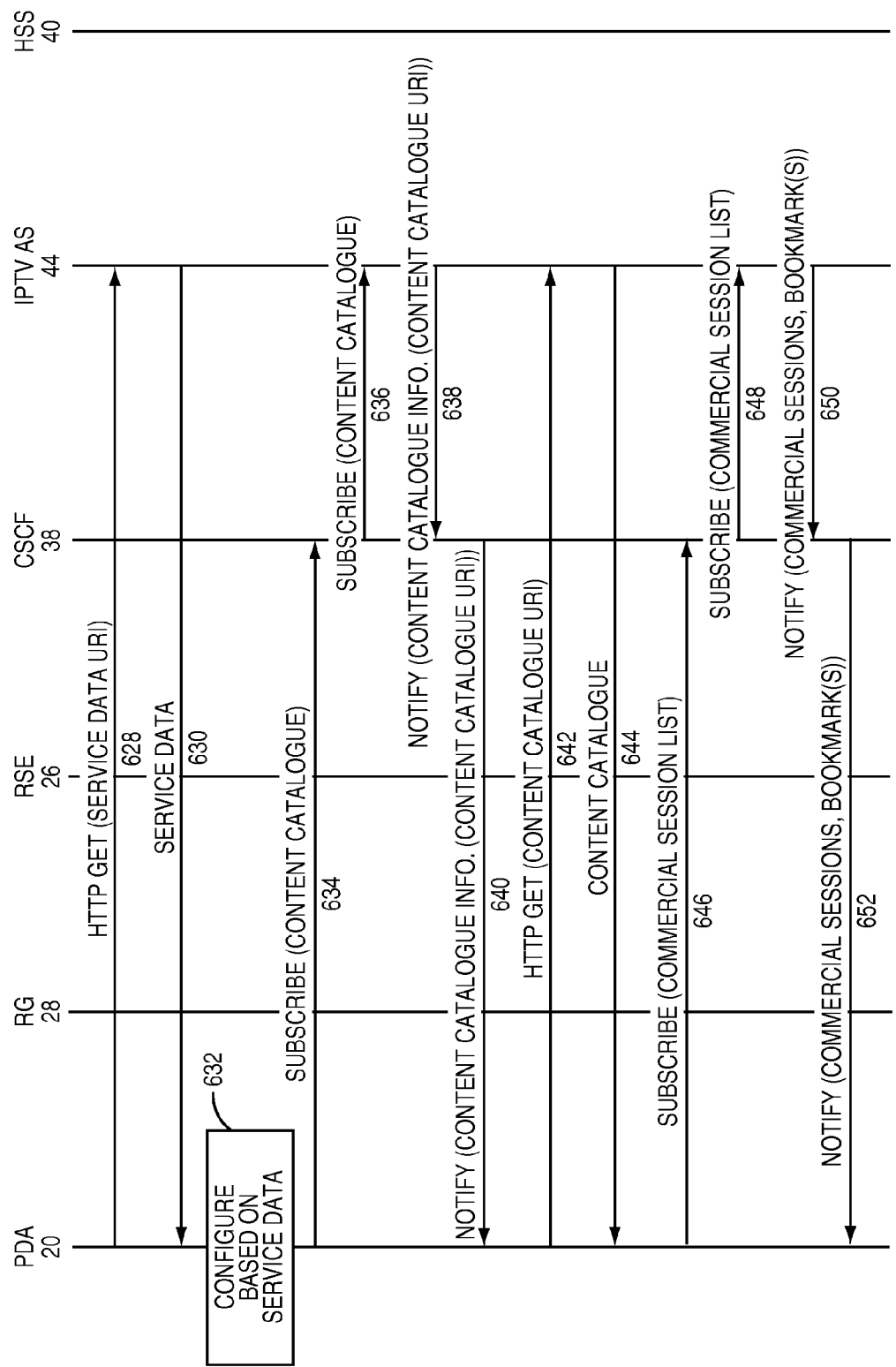
Figure 9A:
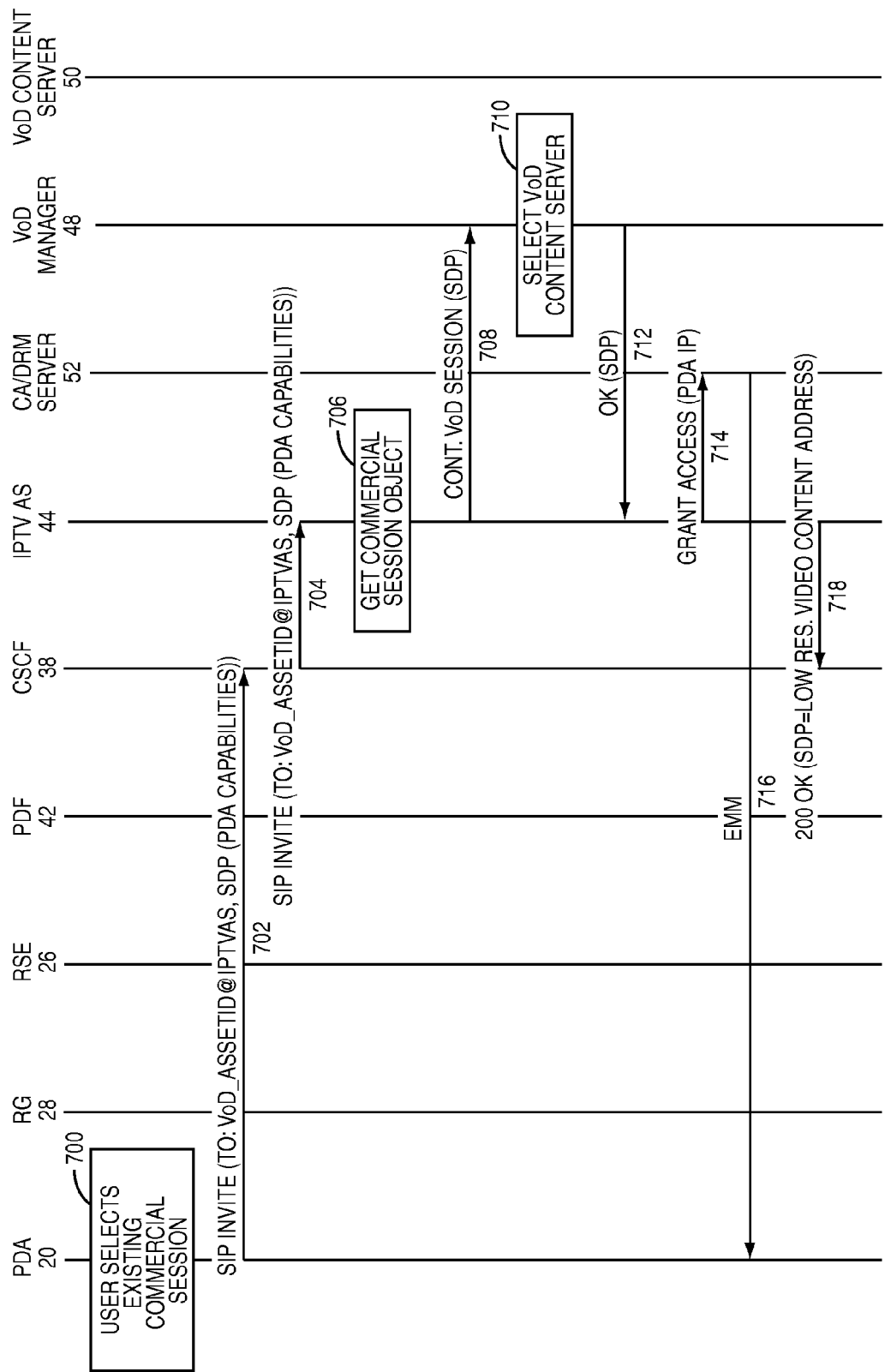
FIGS. 9A and 9B are a communication flow illustrating resuming viewing of VoD video content from a bookmark according to one embodiment of the present invention.
Figure 9B:
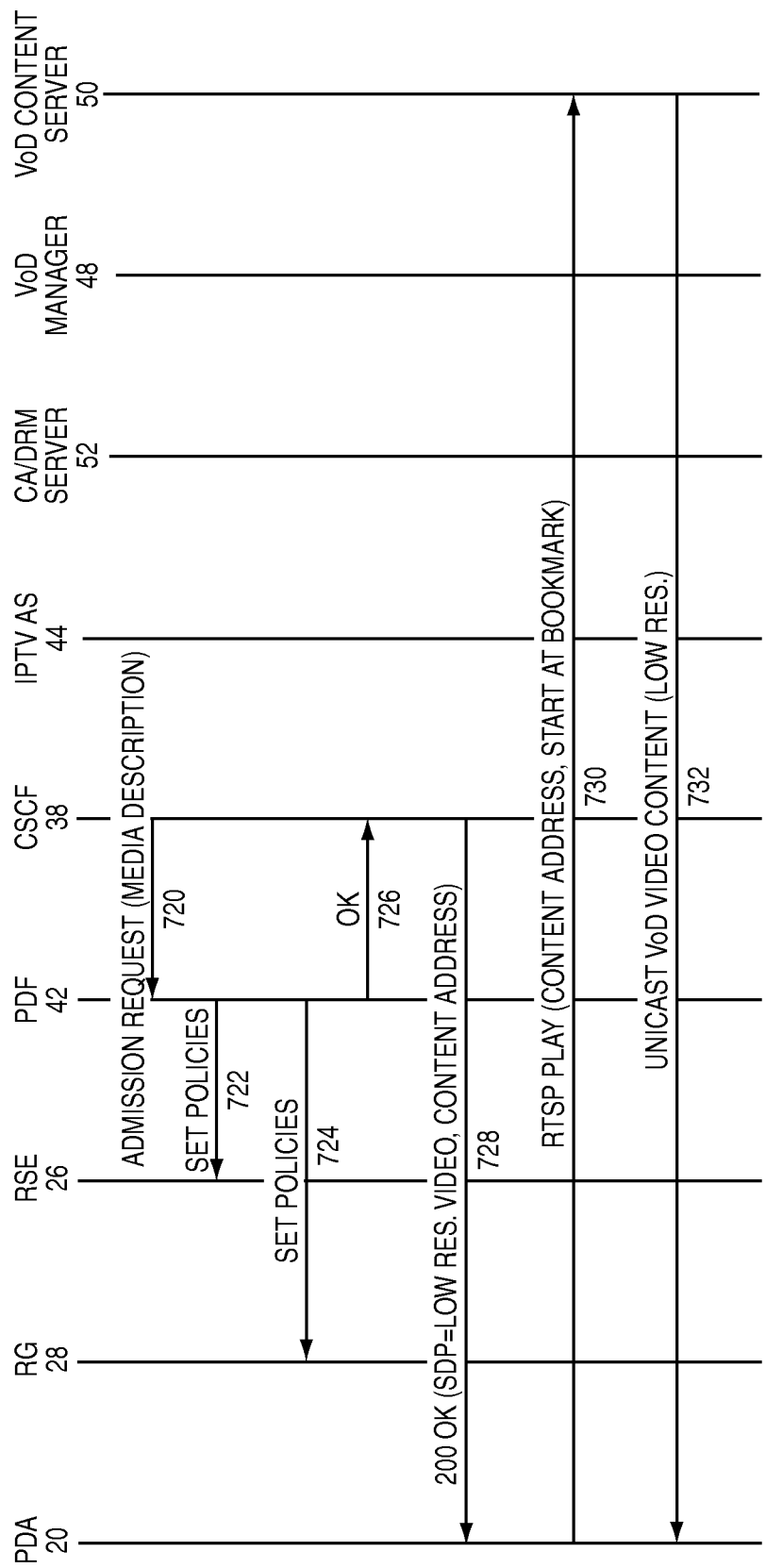

The present invention also allows a VoD IPTV session to be transferred from one subscriber device to another. During this transfer, a bookmark may be stored to identify the location in the program where the transfer took place. The remaining portion of the communication flow of FIGS. 7A-7C illustrates how the bookmark is stored and the VoD IPTV session with the PC 18 is torn down. The communication flow of FIGS. 8A and 8B illustrates registration and initialization of IPTV services from the subscriber's PDA 20, and the communication flow of FIGS. 9A and 9B illustrates the subscriber resuming viewing of the VoD video content from the bookmark via the PDA 20.

With continued reference to FIG. 7C, assume the user stops viewing the VoD content (step 554) and the PC 18 responds by sending an RTSP Tear Down message to the VoD content server 50 (step 556). The RTSP Tear Down message effectively instructs the VoD content server 50 to stop delivery of the VoD video content to the PC 18 via the VoD IPTV session. The VoD content server 50 will store a bookmark, which identifies the location where the VoD video content was stopped (step 558). The VoD content server 50 may provide the bookmark to the IPTV AS 44 for future use (step 560).

Next, assume the user exits the communication client running on the PC 18 (step 562). As such, the PC 18 will recognize that the VoD IPTV session is no longer required, and will send a SIP Bye message to the CSCF 38 (step 564). The CSCF 38 will send a message to the PDF 42 to clear the resource policies (step 566). The PDF 42 will then instruct the RSE 26 and the RG 28 to clear the policies associated with the VoD IPTV session for the PC 18 (step 568 and 570). The CSCF 38 will forward the Bye message to the IPTV AS 44 (step 572), which will instruct the CA/DRM server 52 to void any access rights provided to the PC 18 for the VoD IPTV session (step 574). Accordingly, the CA/DRM server 52 will send a Rights Expiration message to the PC 18 (step 576). At this point, the VoD IPTV session for the PC 18 is extinguished, and all reservations associated therewith are removed.

At this point, assume the subscriber switches from using the PC 18 to using the PDA 20, and wishes to resume viewing of the VoD video content on the PDA 20. Further assume that the subscriber wishes to resume viewing the VoD video content where she left off on the PC 18. With reference to FIGS. 8A and 8B, initially the PDA 20 must be registered. Once again using the IMS infrastructure 12, the PDA 20 will send a Register message to the CSCF 38 (step 600). The Register message will include the public subscriber ID JANEDOE and a private ID, JANEPDA1, for the PDA 20. Again, the public subscriber ID is the same for the set-top box 16, the PC 18, and the PDA 20. The CSCF 38 will send an Authenticate message to the HSS 40 to obtain authentication for Jane Doe in light of the private ID for the PDA 20 (step 602). The HSS 40 will provide any authentication necessary for Jane Doe and the PDA 20 (step 604), and provide an OK message back to the CSCF 38 (step 606) to indicate that authentication is complete. The CSCF 38 will send a 200 OK message back to the PDA 20 to complete the registration process (step 608).

The CSCF 38 will then identify any application servers to notify when the PDA 20 of Jane Doe is registered (step 610). In this instance, the CSCF 38 will determine that the IPTV AS 44 should be notified, and as such, a Register message is sent by the CSCF 38 to the IPTV AS 44 (step 612). The IPTV AS 44 will verify the subscriber status (step 614). At this point, the IPTV AS 44 will send an OK message back to the CSCF 38 (step 618) in response to the Register message (of step 612).

The PDA 20 will also be able to use the Subscribe/Notify mechanism to obtain service data and the content catalogue. In this example, the PDA 20 is better able to obtain documents associated with a URI instead of via a multi-cast group for either of the service data or the content catalogue. As such, the PDA 20 will send a Subscribe message to the CSCF 38 to obtain service data (step 620). The CSCF 38 will send a Subscribe message to the IPTV AS 44 (step 622), which will respond by sending a Notify message providing the service data information, which provides a URI from which actual service data can be retrieved, to the CSCF 38 (step 624). The CSCF 38 will send a Notify message including the service data information to the PDA 20 (step 626). The URI provided in the service data information is used in an HTTP Get message by the PDA 20 to obtain the service data from the IPTV AS 44 (steps 628 and 630). The PDA 20 will configure itself based on the service data (step 632), and proceed to obtain the content catalogue.

The PDA 20 will send a subscribe message to the CSCF 38 to obtain the content catalogue (step 634). The CSCF 38 will send a Subscribe message to the IPTV AS 44 (step 636), which will provide content catalogue information including a URI from which the actual content catalogue can be obtained in a Notify message to the CSCF 38 (step 638). A Notify message is then sent to the PDA 20 (step 640), which will use the URI in the content catalogue information to obtain the content catalogue from the IPTV AS 44 (steps 642 and 644).

In an exemplary embodiment, the PDA 20 may also use the Subscribe/Notify mechanism to obtain information regarding prior commercial sessions, including the VoD IPTV session that was established by the PC 18. Accordingly, the PDA 20 may send a Subscribe message to obtain a list of previous commercial sessions for the subscriber to the CSCF 38 (step 646). The Subscribe message may be forwarded to the IPTV AS 44 (step 648), which will identify any prior commercial sessions and associated bookmarks, and provide this information back to the CSCF 38 in a Notify message (step 650). This Notify message is then provided to the PDA 20 by the CSCF 38 (step 652). At this point, the PDA 20 has all of the necessary service data and the content catalogue, as well as information bearing on prior commercial sessions and their associated bookmarks.

With reference to FIGS. 9A and 9B, assume the user selects the existing commercial session, which was initiated by the PC 18 (step 700). The PDA 20 will then take the necessary steps to initiate a new VoD IPTV session to resume the existing commercial session. The Invite message is addressed to the URI corresponding to the VoD asset described in the existing commercial session and is routed to the CSCF 38 (step 702), which determines that the IPTV AS 44 is the target for the message. The SDP will include the communication capabilities of the PDA 20. In this instance, the communication capabilities indicate that any VoD content provided to the PDA 20 must be in a low resolution context, which is much lower than that used for standard or high definition content. The CSCF 38 will forward the Invite to the IPTV AS 44 (step 704). The IPTV AS 44 will then get any commercial session information associated with the subscriber or VoD asset (step 706), and instruct the VoD manager 48 to continue the VoD session (step 708). The message instructing the VoD manager 48 to continue the VoD session will include the SDP of the PDA 20. The VoD manager 48 will select the VoD content server 50 to use for delivering the requested VoD video content (step 710). The VoD manager 48 will respond by sending an OK message including the SDP associated with the VoD video content and the address of the VoD content server 50 to the IPTV AS 44 (step 712).

Notably, the VoD video content may be provided from a different VoD content server 50 than that used to provide the standard definition or high definition video content to the PC 18 or the set-top box 16. The IPTV AS 44 will instruct the CA/DRM server 52 to grant access for receiving the VoD video content to the PDA 20 (step 714). As such, the CA/DRM server 52 will send the EMM to the PDA 20 (step 716). The IPTV AS 44 will send a 200 OK message including the SDP for the low resolution VoD video content and the content address for the VoD content server 50 to the CSCF 38 (step 718). The CSCF 38 will send an Admission Request including a media description for the VoD video content to the PDF 42 (step 720). The PDF 42 will set resource policies for the VoD video content in light of the media description at the RSE 26 and the RG 28 (steps 722 and 724). Once the resource policies are installed at the RSE 26 and the RG 28, the PDF 42 will send an OK message back to the CSCF 38 (step 726).

The CSCF 38 will now send a 200 OK message to the PDA 20 (step 728). The 200 OK message will again include the SDP for the low resolution video content, as well as the content address for the VoD video content. The PDA 20 is now armed with the content address used for accessing the VoD video content from the VoD content server 50, and may instruct the VoD content server 50 to provide the VoD video content using a media stream control protocol message such as an RTSP Play message (step 730). Within this request, the PDA 20 may include a starting point reference for the video playback which corresponds to the information found in the bookmark associated with the existing commercial session. The VoD content server 50 will respond by providing unicast video of the VoD video content, in a low resolution format, to the PDA 20 (step 732). From the above, the present invention also provides a unique way of transitioning a VoD IPTV session from one device to another, and allows viewing of the VoD video content to resume where a prior VoD IPTV session left off. In an alternative embodiment, the subscriber may perform an explicit, real-time transfer of an IPTV Session from the current viewing device to another registered device.

Figure 10:
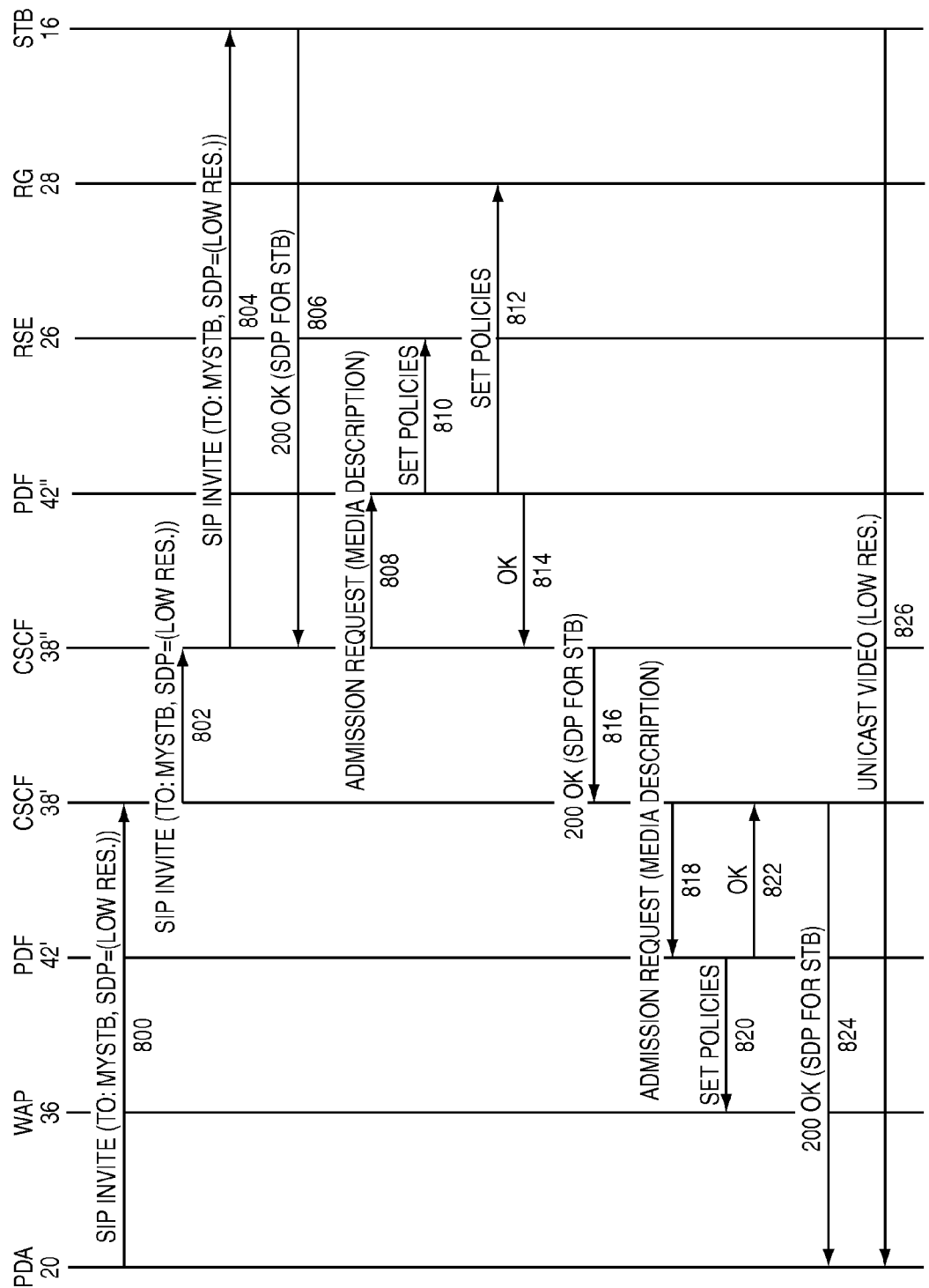
FIG. 10 is a communication flow illustrating streaming video content from one device to another according to one embodiment of the present invention.

With reference to FIG. 10, the present invention also allows video content to be streamed from one subscriber device to another. This aspect of the invention is particularly beneficial when the set-top box 16 is capable of storing video content or forwarding video content that is being streamed to the set-top box 16 from a remote location. The communication flow of FIG. 10 illustrates the retrieval of video content from the set-top box 16 by the PDA 20. Assume the PDA 20 is supported by the WAP 36, a PDF 42', and a CSCF 38'. Assume the set-top box 16 is supported by the RG 28, RSE 26, a PDF 42", and a CSCF 38".

The PDA 20 may initiate the video session by sending a SIP Invite toward the set-top box 16. The SIP Invite is received by the CSCF 38', and will include an SDP indicating the communication capabilities of the PDA 20 (step 800). In this instance, the PDA 20 is capable of receiving low resolution video, which has a resolution below that of standard or high definition video. The SIP Invite is forwarded to the CSCF 38" (step 802), which forwards the SIP Invite to the set-top box 16 (step 804). The set-top box 16 will process the Invite and respond by sending a 200 OK message to the CSCF 38" (step 806). The 200 OK message will include the SDP for the set-top box 16. The CSCF 38" will send an Admission Request to the PDF 42" (step 808). The Admission Request will include a media description sufficient to allow low resolution video to be provided by the set-top box 16 to the PDA 20. The PDF 42" will send messages to the RSE 26 and the RG 28 to set the requisite resource policies (steps 810 and 812). Once the resource policies are installed at the RSE 26 and the RG 28, the PDF 42" will send an OK message to the CSCF 38" (step 814). The CSCF 38" will then send a 200 OK message including the SDP for the set-top box 16 to the CSCF 38' (step 816).

In light of the SDP provided by the PDA 20 and the set-top box 16, the CSCF 38' will send an Admission Request to the PDF 42' (step 818). Again, the admission request will include the media description necessary to provide the low resolution video from the set-top box 16 to the PDA 20. The PDF 42' will send messages to set the resource policies at the WAP 36 (step 820). Upon installing the resource policies, the PDF 42' will provide an OK message back to the CSCF 38' (step 822). The CSCF 38' will then forward the 200 OK message to the PDA 20 (step 824). At this point, the set-top box 16 will start sending unicast video content to the PDA 20 in a low resolution format (step 826).

Figure 11:
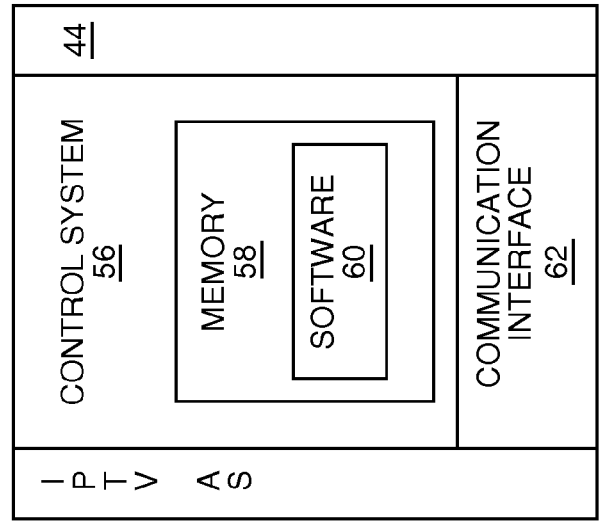
FIG. 11 is a block representation of an IPTV application server (AS) according to one embodiment of the present invention.

With reference to FIG. 11, a block representation of an IPTV AS 44 is illustrated. The IPTV AS 44 may include a control system 56 having sufficient memory 58 for the requisite software 60 to operate as described above. The control system 56 will also be associated with a communication interface 62 to facilitate communications with other nodes in the communication environment 10.

Figure 12:
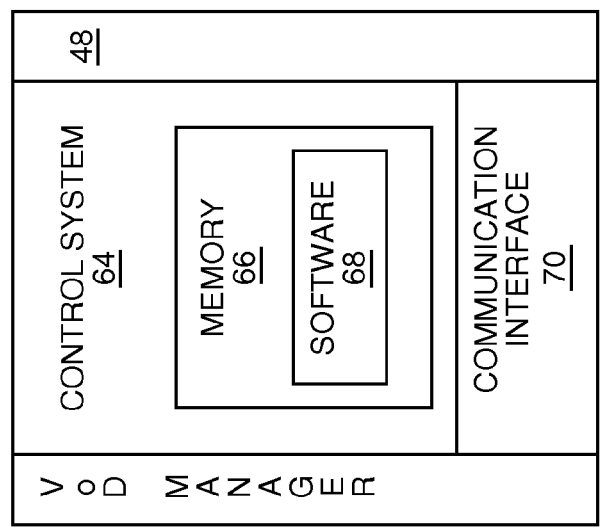
FIG. 12 is a block representation of a VoD manager according to one embodiment of the present invention.

With reference to FIG. 12, a block representation of VoD manager 48 is illustrated. The VoD manager 48 may include a control system 64 having sufficient memory 66 for the requisite software 68 to operate as described above. The control system 64 will also be associated with a communication interface 70 to facilitate communications with other nodes in the communication environment 10.

Figure 13:
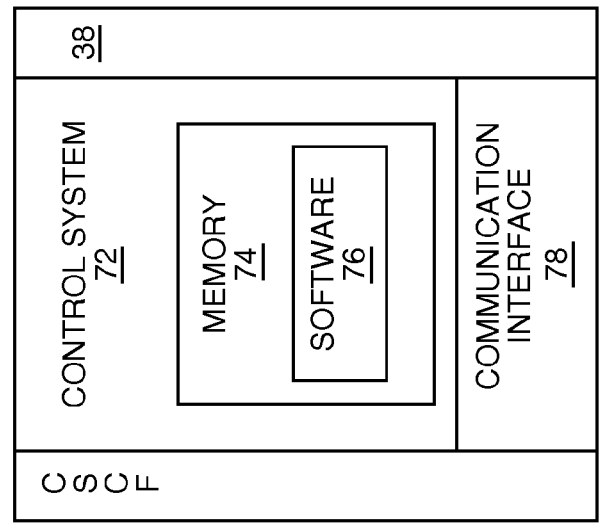
FIG. 13 is a block representation of a call/session control function (CSCF) according to one embodiment of the present invention.

With reference to FIG. 13, a block representation of a CSCF 38 is illustrated. The CSCF 38 may include a control system 72 having sufficient memory 74 for the requisite software 76 to operate as described above. The control system 72 will also be associated with a communication interface 78 to facilitate communications with other nodes in the communication environment 10.

Those skilled in the art will recognize improvements and modifications to the preferred embodiments of the present invention. All such improvements and modifications are considered within the scope of the concepts disclosed herein and the claims that follow.

What is claimed is:

1. A method for providing Internet Protocol television (IPTV) services to a plurality of subscriber devices comprising:

at a control system including a memory device and a communication interface:

utilizing the communication interface to register the plurality of subscriber devices for the IPTV services, the plurality of subscriber devices comprising at least a plurality of different types of communication devices, each with a private identifier and a common subscriber identifier associated with one IPTV subscription for delivery of the IPTV services to each of the plurality of subscriber devices;

utilizing the communication interface to establish a first IPTV session with a first of the plurality of subscriber devices via a multimedia subsystem to enable delivery of streaming media to the first subscriber device, wherein the first IPTV session is established using the common subscriber identifier, the one IPTV subscription, and the private identifier associated with the first subscriber device, wherein the first IPTV session is established based on a first capability associated with the first subscriber device, wherein the streaming media is delivered to the first subscriber device based on the first capability;

storing in the memory device, in association with the first IPTV session, information identifying a point within the streaming media from which to resume streaming;

utilizing the communication interface to establish a second IPTV session with a second of the plurality of subscriber devices via the multimedia subsystem to enable delivery of streaming media to the second subscriber device, wherein the second IPTV session is established using the common subscriber identifier, the one IPTV subscription, and the private identifier associated with the second subscriber device, wherein the second IPTV session is established based on a second capability associated with the second subscriber device, wherein the second capability is different from the first capability; and utilizing the communication interface to effect delivery of the streaming media, beginning at the identified point, to the second subscriber device via the second IPTV session, wherein the streaming media is delivered to the second subscriber device based on the second capability, wherein the streaming media delivered to the second subscriber device is formatted differently from the streaming media delivered to the first subscriber device.

2. The method of claim 1 further comprising registering with at least one IPTV application server based on registration of the plurality of subscriber devices.

3. The method of claim 1 further comprising effecting delivery of certain streaming media to the plurality of subscriber devices.

4. The method of claim 3 wherein effecting delivery of the certain streaming media further comprises providing to at least one of the plurality of subscriber devices an address of a streaming media content server from which the at least one of the plurality of subscriber devices will request the certain streaming media.

5. The method of claim 4 wherein the certain streaming media is on-demand content.

6. The method of claim 3 wherein effecting delivery of the certain streaming media further comprises providing to at least one of the plurality of subscriber devices information sufficient to receive broadcast media.

7. The method of claim 6 wherein the information enables the at least one of the plurality of subscriber devices to receive the broadcast media from at least one of a group consisting of a residential gateway and a residential service edge.

8. The method of claim 1 further comprising effecting delivery to the plurality of subscriber devices information required by the plurality of subscriber devices to process the streaming media.

9. The method of claim 1 wherein different IPTV sessions are established for broadcast streaming media and on-demand streaming media being delivered to the plurality of subscriber devices.

10. The method of claim 1 wherein the plurality of subscriber devices are adapted to change channels within broadcast streaming media within a given IPTV session.

11. The method of claim 1 wherein the streaming media is at least one of the group consisting of streaming audio content and streaming video content.

12. The method of claim 1 further comprising receiving requests for service data required by the plurality of subscriber devices for the IPTV sessions, and providing the service data to the plurality of subscriber devices using a given session control protocol that is used to establish the IPTV sessions.

13. The method of claim 1 further comprising receiving requests for program guide information associated with the streaming media, and providing the program guide information to the plurality of subscriber devices using a given session control protocol, which is also used to establish the IPTV sessions.

14. The method of claim 1 wherein at least two of the plurality of subscriber devices are supported by different types of access networks.

15. The method of claim 1 wherein the IPTV sessions are established for each of the plurality of subscriber devices using a given session control protocol.

16. The method of claim 1 wherein the IPTV sessions for at least two of the plurality of subscriber devices are established in sequence.

17. The method of claim 1 wherein the IPTV sessions for at least two of the plurality of subscriber devices are substantially concurrently established.

18. An apparatus for facilitating Internet Protocol television (IPTV) services to a plurality of subscriber devices comprising:
a memory device;
a communication interface; and
a control system associated with the communication interface and adapted to:
utilize the communication interface to register the plurality of subscriber devices for the IPTV services, the plurality of subscriber devices comprising at least a plurality of different types of communication devices, each with a private identifier and a common subscriber identifier associated with one IPTV subscription for delivery of the IPTV services to each of the plurality of subscriber devices;
utilize the communication interface to establish a first IPTV session with a first of the plurality of subscriber devices via a multimedia subsystem to enable delivery of streaming media to the first subscriber device, wherein the first IPTV session is established using the common subscriber identifier, the one IPTV subscription, and the private identifier associated with the first subscriber, wherein the first IPTV session is established based on a first capability associated with the first subscriber device, wherein the streaming media is delivered to the first subscriber device based on the first capability;
store in the memory device, in association with the first IPTV session, information identifying a point within the streaming media from which to resume streaming;
utilize the communication interface to establish a second IPTV session with a second of the plurality of subscriber devices via the multimedia subsystem to enable delivery of streaming media to the second subscriber device, wherein the second IPTV session is established using the common subscriber identifier, the one IPTV subscription, and the private identifier associated with the second subscriber device, wherein the second IPTV session is established based on a second capability associated with the second subscriber device, wherein the second capability is different from the first capability; and
utilize the communication interface to effect delivery of the streaming media, beginning at the identified point, to the second subscriber device via the second IPTV session, wherein the streaming media is delivered to the second subscriber device based on the second capability, wherein the streaming media delivered to the second subscriber device is formatted differently from the streaming media delivered to the first subscriber device.

* * * * *